United States Patent
Tanahashi et al.

(10) Patent No.: US 9,437,883 B2
(45) Date of Patent: Sep. 6, 2016

(54) MANUFACTURING METHOD OF FUEL CELL MODULE AND MANUFACTURING METHOD OF FUEL CELL

(71) Applicants: Sumitomo Riko Company Limited, Aichi (JP); TOYOTA JIDOSHA KABUSHIKI KAISHA, Aichi-ken (JP)

(72) Inventors: Hideaki Tanahashi, Komaki (JP); Shinichi Haga, Kakamigahara (JP); Hideya Kadono, Kasugai (JP); Yutaka Ishioka, Nagoya (JP); Kenji Sato, Toyota (JP); Fumishige Shizuku, Seto (JP); Hiroo Yoshikawa, Toyota (JP)

(73) Assignees: SUMITOMO RIKO COMPANY LIMITED, Aichi (JP); TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 14/854,609

(22) Filed: Sep. 15, 2015

(65) Prior Publication Data
US 2016/0049670 A1 Feb. 18, 2016

Related U.S. Application Data

(62) Division of application No. 13/203,899, filed as application No. PCT/JP2010/056112 on Mar. 29, 2010, now Pat. No. 9,178,242.

(30) Foreign Application Priority Data

Apr. 1, 2009 (JP) ................................ 2009-088617

(51) Int. Cl.
*H01M 8/02* (2016.01)
*H01M 8/24* (2016.01)
(Continued)

(52) U.S. Cl.
CPC ......... *H01M 8/0286* (2013.01); *H01M 8/0273* (2013.01); *H01M 8/0276* (2013.01);
(Continued)

(58) Field of Classification Search
CPC ........ H01M 2/145; H01M 2/08; H01M 2/14; H01M 2/1653; H01M 2/1673; H01M 8/00; H01M 8/0273; H01M 8/0276; H01M 8/242
See application file for complete search history.

(56) References Cited

U.S. PATENT DOCUMENTS 6,451,469 B1 9/2002 Nakamura et al.
6,596,427 B1 7/2003 Woznixzka et al.
(Continued)

FOREIGN PATENT DOCUMENTS

CA 2 622 174 3/2007
EP 1 073 138 1/2001
(Continued)

OTHER PUBLICATIONS

International Search Report for International Application No. PCT/JP2010/056112, mail date is Jun. 16, 2010.
(Continued)

*Primary Examiner* — Jeremiah Smith
(74) *Attorney, Agent, or Firm* — Greenblum & Bernstein, P.L.C.

(57) ABSTRACT

A manufacturing method of a fuel cell module includes: forming an outer divided body having a frame shape and formed from an uncrosslinked item of solid rubber having adhesiveness in a seal member arrangement portion of a separator to produce an outer temporary assembly, and forming an inner divided body having a frame shape and formed from an uncrosslinked item of solid rubber in a peripheral edge portion of an electrode member to produce an inner temporary assembly; fitting the inner temporary assembly into a frame of the outer temporary assembly to produce a cell assembly temporary assembly; arranging a cell assembly stack, in which a plurality of the cell assembly temporary assemblies are stacked, in a forming die; and pressurizing and heating the forming die to crosslink the uncrosslinked item

9 Claims, 11 Drawing Sheets

(51) Int. Cl.
*H01M 8/10* (2016.01)
*H01M 8/00* (2016.01)
*H01M 2/14* (2006.01)
*H01M 2/08* (2006.01)
*H01M 2/16* (2006.01)

(52) U.S. Cl.
CPC ......... H01M8/0284 (2013.01); H01M 8/1002 (2013.01); H01M 8/242 (2013.01); H01M 8/249 (2013.01); *H01M 2/08* (2013.01); *H01M 2/14* (2013.01); *H01M 2/145* (2013.01); *H01M 2/16* (2013.01); *H01M 8/00* (2013.01); *H01M 8/0247* (2013.01); *H01M 2250/20* (2013.01); *Y02E 60/521* (2013.01); *Y02P 70/56* (2015.11)

(56) References Cited

U.S. PATENT DOCUMENTS

| | | | |
|---|---|---|---|
| 9,017,901 | B2 | 4/2015 | Tanahashi et al. |
| 9,178,242 | B2* | 11/2015 | Tanahashi ........... H01M 8/0273 |
| 2004/0137307 | A1 | 7/2004 | Okonogi et al. |
| 2005/0014056 | A1 | 1/2005 | Zuber et al. |
| 2005/0020740 | A1 | 1/2005 | Matsunaga et al. |
| 2005/0100776 | A1* | 5/2005 | Brunk ...................... C25B 9/10 429/481 |
| 2005/0233200 | A1 | 10/2005 | Miller |
| 2005/0255372 | A1 | 11/2005 | Lertola |
| 2006/0127737 | A1 | 6/2006 | Frank et al. |
| 2006/0141318 | A1 | 6/2006 | MacKinnon et al. |
| 2007/0210475 | A1 | 9/2007 | Pflaesterer |
| 2009/0162718 | A1 | 6/2009 | Extrand |
| 2009/0253014 | A1 | 10/2009 | Tanahashi et al. |
| 2010/0047649 | A1 | 2/2010 | Yamada et al. |

FOREIGN PATENT DOCUMENTS

| | | |
|---|---|---|
| EP | 2 107 628 A1 | 10/2009 |
| JP | 2001-510932 | 8/2001 |
| JP | 2005-047262 | 2/2005 |
| JP | 2008-123883 | 5/2008 |
| WO | 99/04446 | 1/1999 |
| WO | 2007/064777 | 7/2007 |
| WO | 2008/016185 | 7/2008 |

OTHER PUBLICATIONS

Written Opinion for International Application No. PCT/JP2010/056112.

* cited by examiner

MANUFACTURING METHOD OF FUEL CELL MODULE AND MANUFACTURING METHOD OF FUEL CELL

CROSS-REFERENCE TO RELATED APPLICATION

The present application is a divisional application of pending U.S. application Ser. No. 13/203,899 (now U.S. Pat. No. 9,178,242) filed on Aug. 30, 2011, which is a National Stage Application of PCT/JP2010/056112 filed Mar. 29, 2010, which claims priority to Japanese Application No. 2009-088617, filed Apr. 1, 2009. The disclosures of which are expressly incorporated herein by reference in their entireties.

TECHNICAL FIELD

The present invention relates to a manufacturing method of a fuel cell module in which a plurality of cell assemblies formed by integrating an electrode member and a separator with each other are stacked, and to a manufacturing method of a fuel cell.

BACKGROUND ART

A Fuel cell generating electricity from electrochemical reactions of gases has a high power generation efficiency and an extremely small impact on the environment since the discharged gas is clean. Among these, the proton-exchange membrane fuel cell is capable of operating at relatively low temperatures and has a large output density. For this reason, its application to various fields such as power generation and as a power source for automobiles is anticipated.

In the proton-exchange membrane fuel cell, a cell in which separators sandwich a membrane electrode assembly (MEA) or the like serves as the unit of power generation. The MEA is formed from a polymer membrane (electrolyte membrane) acting as an electrolyte, and a pair of electrode catalyst layers (a fuel electrode (anode) catalyst layer and an oxygen electrode (cathode) catalyst layer) respectively arranged on both sides of the electrolyte membrane in the thickness direction. On the surfaces of the pair of electrode catalyst layers a gas diffusion layer is further disposed. Fuel gas such as hydrogen is supplied to the fuel electrode side, while an oxidizing gas such as oxygen and air is supplied to the oxygen electrode side. The supplied gas, the electrolyte, and the electrode catalyst layers are subjected to an electrochemical reaction at the three-phase boundary to generate electricity. The proton-exchange membrane fuel cell is structured by sandwiching a cell stack in which a plurality of the above cells are stacked together between end plates or the like disposed on both ends of the fuel cell in the cell stacking direction.

A manifold serving as a flow path for gas or water is formed on the peripheral edge portion of the cell stack. Mixing of the gases supplied to the respective electrodes creates issues such as lowered power generation efficiency. Also, the electrolyte membrane exhibits proton conductance in a state with water contained therein.

Therefore, during operation the electrolyte must maintain a wet state. Accordingly, in order to prevent gas mixing and leakage, as well as maintain a wet state within the cells, a seal member is disposed on the peripheral edge portion of the manifold and the MEA (see Japanese Patent Application Publication Nos. JP-A-2008-123883, JP-W-2001-510932, and JP-A-2005-47262 for examples).

CITATION LIST

Patent Literature

PLT 1: JP-A-2008-123883
PLT 2: JP-W-2001-510932
PLT 3: JP-A-2005-47262

SUMMARY OF INVENTION

Technical Problem

According to Japanese Patent Application Publication Nos. JP-A-2008-123883 and JP-W-2001-510932, the electrode member and the seal member are integrated by injection molding of a liquid rubber for the seal member to the peripheral edge portion of the electrode member which is formed from the MEA, the gas diffusion layer, and so forth.

However, According to such conventional method, there are the following three issues. The first issue is the low mechanical strength of the seal member. In the conventional method, liquid rubber such as silicone rubber is used as the seal member. But most liquid rubber has a low molecular weight. As a consequence, there is little tensile strength after crosslinking. Since the liquid rubber also does not stretch much, the liquid rubber does not easily follow the expansion and contraction of the electrolyte membrane as a result of moisture and the like. Furthermore, silicone rubber does not have sufficient adhesiveness or acid resistance, which is problematic in terms of sealability and durability.

The second issue the risk of excessive impregnation with rubber to a porous layer during molding, when liquid rubber is used. Namely, when pouring and molding liquid rubber into the peripheral edge portion of the electrode member, the liquid rubber impregnates porous layers such as the gas diffusion layer. In such case, impregnation of the liquid rubber is difficult to control. Therefore, the flow of gas is impeded at regions excessively impregnated with the liquid rubber, and power generation performance is reduced by a corresponding amount.

The third issue is the risk of misalignment of the electrode member during injection molding due to the injection pressure of the liquid rubber. In addition, there is the risk of deformation of the electrolyte membrane. The electrolyte membrane is a thin polymer film. Therefore, the flow of liquid rubber during injection molding may press against and deform the electrolyte membrane. If the electrolyte membrane is deformed, obtaining a desired power generation performance becomes difficult.

According to Japanese Patent Application Publication No. JP-A-2008-123883, the proton-exchange membrane fuel cell is manufactured by stacking a plurality of cell assemblies in which an electrode member and a separator are integrated with each other by a seal member. However, it is not easy to position the cell assemblies during stacking. Also, it is difficult to stack the plurality of cell assemblies while maintaining them at predetermined positions. Thus, assembly of the proton-exchange membrane fuel cell according to the related art requires much time and effort. This results in low productivity.

The present invention has been developed in view of such circumstances, and it is an object of the present invention to provide a convenient method of manufacturing a fuel cell module in which a plurality of cell assemblies formed by integrating an electrode member and a separator with each other are stacked. It is another object of the present invention to provide a convenient method of manufacturing a fuel cell from the manufactured fuel cell modules.

Solution to Problem (1) In order to address the aforementioned issues, a first aspect of the present invention provides a first manufacturing method of a fuel cell module in which a plurality of cell assemblies are stacked, each cell assembly including: an electrode member having a membrane electrode assembly formed from an electrolyte membrane and a pair of electrode catalyst layers disposed on both sides of the electrolyte membrane in a thickness direction, and a pair of porous layers disposed on both sides of the membrane electrode assembly in the thickness direction; a separator having an electrode member arrangement portion arranged to be stacked with the electrode member and with which one side of the electrode member in the thickness direction is in contact, and a seal member arrangement portion having a frame shape and disposed on an outer side of the electrode member arrangement portion in a planar direction; and a seal member formed from a crosslinked item of solid rubber and disposed in the seal member arrangement portion to seal a peripheral edge portion of the electrode member along a shape of the peripheral edge portion and integrate the electrode member and the separator with each other, the method including the steps of: forming an outer divided body having a frame shape and formed from an uncrosslinked item of solid rubber having adhesiveness in the seal member arrangement portion of the separator to produce an outer temporary assembly, and forming an inner divided body having a frame shape and formed from an uncrosslinked item of solid rubber in the peripheral edge portion of the electrode member to produce an inner temporary assembly, as a preliminary production step; fitting the inner temporary assembly into a frame of the outer temporary assembly to produce a cell assembly temporary assembly, as an incorporation step; arranging a cell assembly stack, in which a plurality of the cell assembly temporary assemblies are stacked, in a forming die, as a member arrangement step; and pressurizing and heating the forming die to crosslink the uncrosslinked item, thereby forming the seal member by integrating the outer divided body and the inner divided body with each other, the seal member sealing the peripheral edge portion of the electrode member and integrating the electrode member and the separator with each other to produce the cell assembly from the cell assembly temporary assemblies, and the seal member also integrating the cell assembly temporary assemblies which are adjacent in the stacking direction with each other to produce the fuel cell module from the cell assembly stack, as an integration step.

The term "solid rubber" used herein is an expression used in contrast to "liquid rubber", and refers to kneadable rubber that is solid at room temperature. That is, according to the first manufacturing method of a fuel cell module (hereinafter occasionally simply referred to as "module") of the present invention, rubber that is solid at room temperature is used rather than liquid rubber. Therefore, the cell assembly temporary assemblies can be produced in advance using an uncrosslinked item of solid rubber. Accordingly, the fuel cell module can be manufactured conveniently by stacking a plurality of the cell assembly temporary assemblies and performing integral molding.

Since no liquid rubber is used, the above three issues can be resolved. That is, solid rubber has considerable tensile strength and elongation compared to liquid rubber. There is no need to regulate the amount of liquid rubber with which the porous layers are impregnated. Furthermore, there is no risk of the electrode member being misaligned or the electrolyte membrane being deformed by the injection pressure of liquid rubber.

In the integration step, the peripheral edge portion of the electrode member is sealed by the seal member formed from a crosslinked item of solid rubber. The electrode member and the seal member are strongly bonded to each other by the adhesive force of the solid rubber. Solid rubber has considerable tensile strength and elongation compared to liquid rubber. For this reason, the peripheral edge portion of the electrode member has high sealability. The seal member easily follows the expansion and contraction of the electrolyte membrane. Thus, according to the first manufacturing method of a fuel cell module of the present invention, a fuel cell module having a sealed region with high durability can be manufactured.

According to the first manufacturing method of a fuel cell module of the present invention, in the preliminary production step, the outer temporary assembly having the separator and the outer divided body having a frame shape and formed in the seal member arrangement portion of the separator is produced, and the inner temporary assembly having the electrode member and the inner divided body having a frame shape and formed in the peripheral edge portion of the electrode member is produced. Then, in the incorporation step, the inner temporary assembly is fitted into the frame of the outer temporary assembly to produce the cell assembly temporary assembly. That is, in the incorporation step, the inner temporary assembly can be disposed using the position of the outer divided body as a reference. Namely, the inner temporary assembly may be disposed such that the outer divided body and the inner divided body are incorporated with each other. This allows easy positioning of the electrode member. Moreover, the electrode member is fixed by the inner divided body and the outer divided body. Also, the separator is fixed by the inner divided body and the outer divided body. Therefore, the electrode member and the separator are not easily misaligned during stacking of the cell assembly temporary assemblies.

According to the first manufacturing method of a fuel cell module of the present invention, the entire cell assembly stack in which the cell assembly temporary assemblies are stacked is pressurized and heated to crosslink the uncrosslinked item (the inner divided body and the outer divided body). Therefore, the total crosslinking time can be reduced compared to a case where the cell assembly temporary assemblies are subjected to crosslinking one by one. Hence, the fuel cell module can be produced with improved efficiency. Thus, according to the first manufacturing method of a fuel cell module of the present invention, the structural elements can be positioned easily, and misalignment of the structural elements can be suppressed. Consequently, the fuel cell module can be manufactured conveniently and efficiently.

The fuel cell can be easily assembled by just stacking the manufactured fuel cell modules and fastening them via end plates or the like. A desired fuel cell module can be individually taken out from the fuel cell after the assembly as necessary. Therefore, the fuel cell can be easily inspected and repaired.

(2) A second aspect of the present invention provides a second manufacturing method of a fuel cell module in which a plurality of cell assemblies are stacked, each cell assembly including: an electrode member having a membrane electrode assembly formed from an electrolyte membrane and a pair of electrode catalyst layers disposed on both sides of the electrolyte membrane in a thickness direction, and a pair of porous layers disposed on both sides of the membrane electrode assembly in the thickness direction; a separator having an electrode member arrangement portion arranged to be stacked with the electrode member and with which one side of the electrode member in the thickness direction is in contact, and a seal member arrangement portion having a frame shape and disposed on an outer side of the electrode member arrangement portion in a planar direction; and a seal member formed from a crosslinked item of solid rubber and disposed in the seal member arrangement portion to seal a peripheral edge portion of the electrode member along a shape of the peripheral edge portion and integrate the electrode member and the separator with each other, the method including the steps of: forming a seal member preform having a frame shape and formed from an uncrosslinked item of solid rubber having adhesiveness in the seal member arrangement portion of the separator to produce a seal member temporary assembly, as a preliminary production step; fitting the electrode member into a frame of the seal member temporary assembly to produce a cell assembly temporary assembly, as an incorporation step; arranging a cell assembly stack, in which a plurality of the cell assembly temporary assemblies are stacked, in a forming die, as a member arrangement step; and pressurizing and heating the forming die to crosslink the uncrosslinked item, thereby forming the seal member from the seal member preform, the seal member sealing the peripheral edge portion of the electrode member and integrating the electrode member and the separator with each other to produce the cell assembly from the cell assembly temporary assemblies, and the seal member also integrating the cell assembly temporary assemblies which are adjacent in the stacking direction with each other to produce the fuel cell module from the cell assembly stack, as an integration step.

Also according to the second manufacturing method of a fuel cell module of the present invention, as with the first manufacturing method of a fuel cell module of the present invention discussed in (1) above, rubber that is solid at room temperature is used rather than liquid rubber. Therefore, the cell assembly temporary assemblies can be produced in advance using an uncrosslinked item of solid rubber. Accordingly, the fuel cell module can be manufactured conveniently by stacking a plurality of the cell assembly temporary assemblies and performing integral molding. Since no liquid rubber is used, the above three issues can be resolved. Further, the manufactured fuel cell module has a sealed region with high durability.

According to the second manufacturing method of a fuel cell module of the present invention, in the preliminary production step, the seal member temporary assembly having the separator and the seal member preform having a frame shape and formed in the seal member arrangement portion of the separator is produced. Then, in the incorporation step, the electrode member is fitted into the frame of the seal member temporary assembly to produce the cell assembly temporary assembly. That is, in the incorporation step, the electrode member can be disposed using the position of the seal member preform as a reference. This allows easy positioning of the electrode member. Moreover, the electrode member is fixed by the seal member preform. Also, the separator is fixed by the seal member preform. Therefore, the electrode member and the separator are not easily misaligned during stacking of the cell assembly temporary assemblies.

According to the second manufacturing method of a fuel cell module of the present invention, the entire cell assembly stack in which the cell assembly temporary assemblies are stacked is pressurized and heated to crosslink the uncrosslinked item (the seal member preform). Therefore, the total crosslinking time can be reduced compared to a case where the cell assembly temporary assemblies are subjected to crosslinking one by one. Hence, the fuel cell module can be produced with improved efficiency. Thus, according to the second manufacturing method of a fuel cell module of the present invention, the structural elements can be positioned easily, and misalignment of the structural elements can be suppressed. Consequently, the fuel cell module can be manufactured conveniently and efficiently.

(3) According to a third aspect of the present invention, in the above configuration of (2), it is preferable that the electrode member has a stepped portion that is stepped as viewed in cross section in the thickness direction in at least a part of the peripheral edge portion, and a die-symmetric stepped portion having a shape that matches the stepped portion is formed on an inner side of the frame of the seal member preform in the preliminary production step.

According to the present configuration, the seal member preform has a die-symmetric stepped portion having a shape that matches the stepped portion of the electrode member on an inner side of the frame of the seal member preform. Hence, the seal member preform (seal member) can be formed to match the shape of the peripheral edge portion of the electrode member without being divided. The present configuration is suitable for a case where it is difficult to form the seal member preform in a divided manner because, for example, the seal member is so thin. According to the present configuration, in the incorporation step, the electrode member can be positioned easily by just placing the electrode member in the frame of the seal member temporary assembly such that the die-symmetric stepped portion of the seal member preform and the stepped portion of the electrode member are in contact with each other. Hence, according to the present configuration, the fuel cell module can be manufactured more conveniently.

(4) According to a fourth aspect of the present invention, in the above configuration of (1) or (2), it is preferable that the cell assembly temporary assemblies have a penetration hole which penetrates in the thickness direction of the electrode member and through which one of oxidizing gas, fuel gas, and coolant flows, a plug is disposed in the penetration hole in the member arrangement step such that the uncrosslinked item does not flow into the penetration hole in the integration step, and the plug is removed after the fuel cell module is produced in the integration step.

The seal member structuring the cell assembly is formed with a plurality of through holes serving as flow paths for oxidizing gas, fuel gas, or coolant. The seal member is formed by crosslinking the uncrosslinked item of solid rubber (the outer divided body and the inner divided body, or the seal member preform) of the cell assembly temporary assembly in the integration step. Hence, the cell assembly temporary assembly has penetration holes corresponding to the through holes of the seal member. According to the present configuration, the plug is disposed in the penetration hole in advance in the member arrangement step, which prevents the uncrosslinked item of solid rubber from flowing into the penetration hole upon pressurization in the integration step. A through hole with predetermined shape and size can be formed by removing the plug after crosslinking.

(5) According to a fifth aspect of the present invention, in the above configuration of (1) or (2), it is preferable that, among the pair of porous layers disposed on both sides of the membrane electrode assembly in the thickness direction, the porous layer disposed on one side of the membrane electrode assembly in the thickness direction has at least one of a gas diffusion layer and a gas flow path layer whose porosity or average pore diameter is larger than that of the gas diffusion layer, and the porous layer disposed on the other side of the membrane electrode assembly in the thickness direction has at least one of a gas diffusion layer and a gas flow path layer whose porosity or average pore diameter is larger than that of the gas diffusion layer.

The structures of the respective porous layers disposed on both sides of the membrane electrode assembly (MEA) in the thickness direction may be identical to or different from each other. According to the present configuration, the pair of porous layers have at least one of a gas diffusion layer and a gas flow path layer. The gas diffusion layer serves to spread supplied gas in the thickness direction and supply gas to the entire surface of the adjacent electrode catalyst layer. Meanwhile, the gas flow path layer serves to supply gas delivered via the adjacent separator to the MEA or the gas diffusion layer. In other words, the gas flow path layer mainly serves to guide gas in a predetermined direction. Therefore, in order to decrease the pressure loss of the gas flow and increase drainage, the porosity of the gas flow path layer is larger than that of the gas diffusion layer. Alternatively, the average pore diameter of the gas flow path layer is larger than that of the gas diffusion layer. The average pore diameter is the average diameter of a number of pores. For example, by structuring the porous layer from two layers having different porosities or average pore diameters, gas can be evenly supplied to all of one or the other side of the MEA in the thickness direction.

(6) According to a sixth aspect of the present invention, in the above configuration of (1) or (2), it is preferable that the pair of porous layers disposed on both sides of the membrane electrode assembly in the thickness direction have the gas diffusion layer respectively, and an area of the membrane electrode assembly is larger than an area of at least one gas diffusion layer According to the present configuration, the leakage of gas from the end side of one of the gas diffusion layers to the end side of the other gas diffusion layer is suppressed by the seal member, which has impregnated both end sides of the gas diffusion layers. However, even in a case where the seal member does not sufficiently impregnate and there is gas leaking from the end side of one of the gas diffusion layers, if the area of the MEA is large as in the present configuration, then the seal member coating the MEA and the peripheral edge portion thereof becomes a barrier and can reliably prevent gas from leaking to the end side of the other gas diffusion layer.

(7) According to a seventh aspect of the present invention, in the above configuration of (1) or (2), it is preferable that the solid rubber includes one or more rubber components selected from a group consisting of ethylene-propylene rubber, ethylene-propylene-diene rubber, acrylonitrile-butadiene rubber, hydrogenated acrylonitrile-butadiene rubber, styrene-butadiene rubber, and butadiene rubber.

According to the present configuration, a tensile product of the solid rubber is large. A larger tensile product indicates that more energy is required to break. As a consequence, the sealed regions have good durability.

(8) According to a eighth aspect of the present invention, in the above configuration of (1) or (2), it is preferable that the uncrosslinked item of solid rubber includes the following contents of (A) to (D): (A) at least one rubber component selected from a group consisting of ethylene-propylene rubber, ethylene-propylene-diene rubber, acrylonitrile-butadiene rubber, and hydrogenated acrylonitrile-butadiene rubber; (B) a crosslinking agent selected from organic peroxides of which a 1-hour half-life period temperature is lower than or equal to 130° C.; (C) a crosslinking auxiliary agent; and (D) an adhesive component formed of at least one of a resorcinol compound together with a melamine compound and a silane coupling agent.

A rubber in which the uncrosslinked item including the contents of the above (A) to (D) is made to crosslink has low gas permeability. Thus according to the present configuration, the sealability of the seal member can be increased. In addition, organic peroxides of which a 1-hour half-life period temperature is lower than or equal to 130° C.. are used as a crosslinking agent in the present configuration (the above (B)). Here, the term "half-life period" is a time until the concentration of the organic peroxide becomes half an initial value. Accordingly, the term "half-life period temperature" is indicative of the decomposition temperature of the organic peroxide. The term "1-hour half-life period" is the temperature when the half-life period is 1 hour. In other words, a lower 1-hour half-life period indicates a greater tendency toward decomposition at low temperatures. By using an organic peroxide whose 1-hour half-life period temperature is lower than or equal to 130° C., crosslinking can be achieved at a lower temperature (i.e., lower than or equal to 130° C.) and in a shorter period. Therefore, deterioration of the electrolyte membrane due to heating during molding (crosslinking) can also be suppressed. The crosslinking agent of (B) is not prone to curing defects caused by impurities, contamination, and the like. Therefore, the crosslinking agent of (B) is resistant to the effects of the surrounding environment during operations and easy to handle.

If a resorcinol compound and a melamine compound are used in the adhesive component of (D), then the melamine compound is the methylene donor and the resorcinol compound is the methylene recipient. During crosslinking, chemical bonds are formed between the resorcinol compound, and the rubber component and a mating member, due to the donation of a methylene group. Whereby, the rubber component and the mating member are adhered. If a silane coupling agent is used in the adhesive component of (D), then chemical bonds are formed between the rubber component and the mating member via the silane coupling agent, whereby both are adhered together. A high adhesion force is achieved due to these adhesive components, and the adhesion force is not prone to decreasing even in the operation environment of a fuel cell. Accordingly, good sealability can be secured even when the fuel cell is operated for a long period. In other words, the operation reliability of the fuel cell is improved.

(9) A ninth aspect of the present invention provides a manufacturing method of a fuel cell, including the step of stacking a plurality of the fuel cell modules produced in accordance with the manufacturing method of a fuel cell module according to the above configuration of (1) or (2) in the thickness direction of the electrode member to produce a fuel cell.

The fuel cell module manufactured in accordance with one of the above two manufacturing methods of the present invention is formed by stacking a plurality of cell assemblies. Therefore, the fuel cell can be easily assembled by just stacking the fuel cell modules and fastening them via end plates or the like. Consequently, according to the manufacturing method of a fuel cell of the present invention, the time and effort previously required for the assembly can be reduced, which allows the fuel cell to be produced with improved efficiency.

Advantageous Effects of Invention

According to the present invention, a fuel cell module in which a plurality of cell assemblies are stacked can be manufactured conveniently. Also, a fuel cell can be manufactured conveniently using the manufactured fuel cell modules.

DESCRIPTION OF EMBODIMENTS

A manufacturing method of a fuel cell module and a manufacturing method of a fuel cell according to embodiments of the present invention will be described below.

First Embodiment

Figure 1:
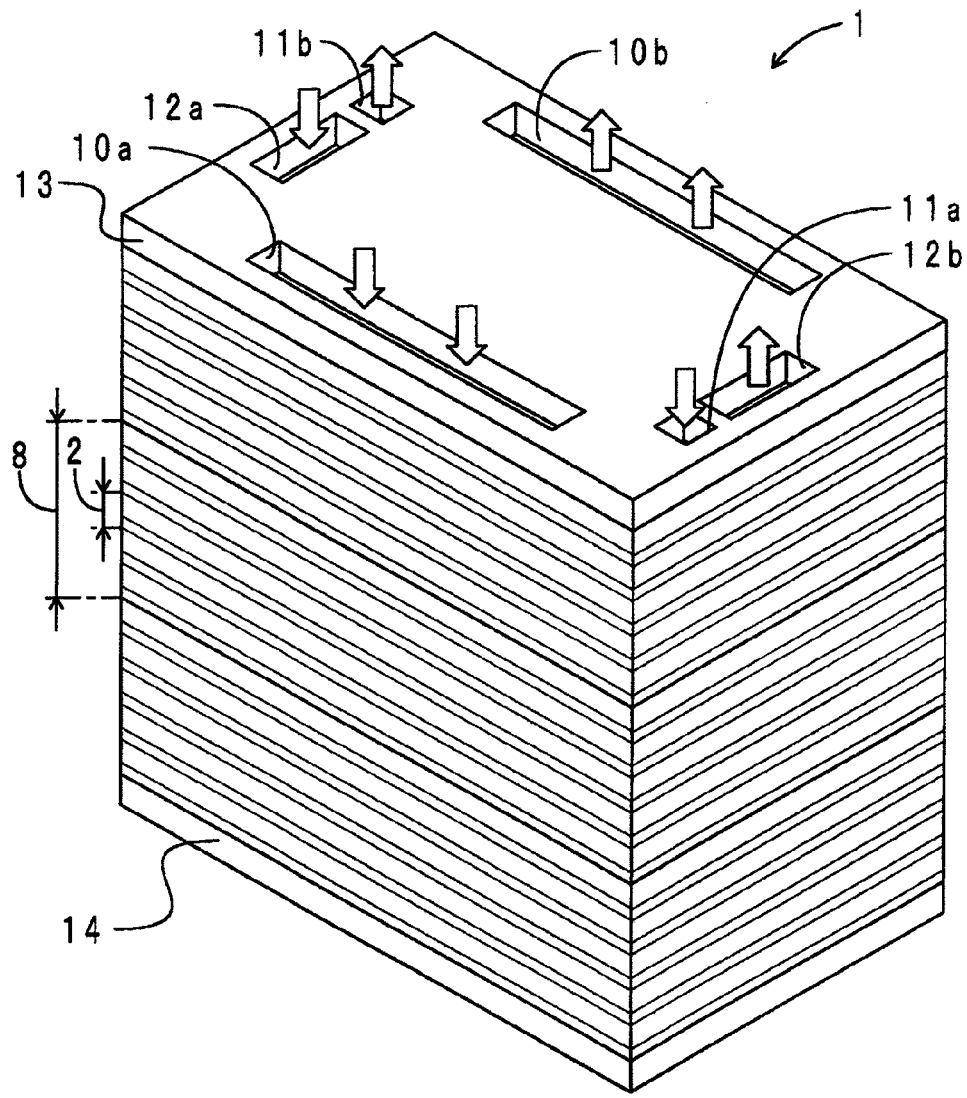
FIG. 1 is a perspective view of a fuel cell including fuel cell modules manufactured in accordance with a manufacturing method of a fuel cell module according to a first embodiment.

[Configuration of Fuel Cell]
First, the configuration of a fuel cell including fuel cell modules manufactured in accordance with the manufacturing method of a fuel cell module according to the present embodiment will be described. FIG. 1 is a perspective view of a fuel cell including fuel cell modules manufactured in accordance with the manufacturing method of a fuel cell module according to the present embodiment. As shown in FIG. 1, a fuel cell 1 is structured by stacking three modules 8. Each module 8 is structured by stacking five cell assemblies 2.

The fuel cell 1 is a proton-exchange membrane fuel cell. A pair of end plates 13, 14 are respectively disposed on both ends of the modules 8 in the stacking direction. The pair of end plates 13, 14 are made of stainless steel, and have a rectangular plate shape. Formed along the four sides of the end plate 13 are an air supply hole 10a that supplies air (oxidizing gas), an air discharge hole 10b that discharges air, a hydrogen supply hole 11a that supplies hydrogen (fuel gas), a hydrogen discharge hole 11b that discharges hydrogen, a coolant supply hole 12a that supplies coolant, and a coolant discharge hole 12b that discharges coolant. The cell assemblies 2 (modules 8) are also formed with a plurality of through holes described later that correspond to the holes 10a, 10b, 11a, 11b, 12a, 12b. Accordingly, flow paths for air, hydrogen, and coolant are respectively provided penetrating in the stacking direction of the modules 8 of the fuel cell 1.

Figure 2:
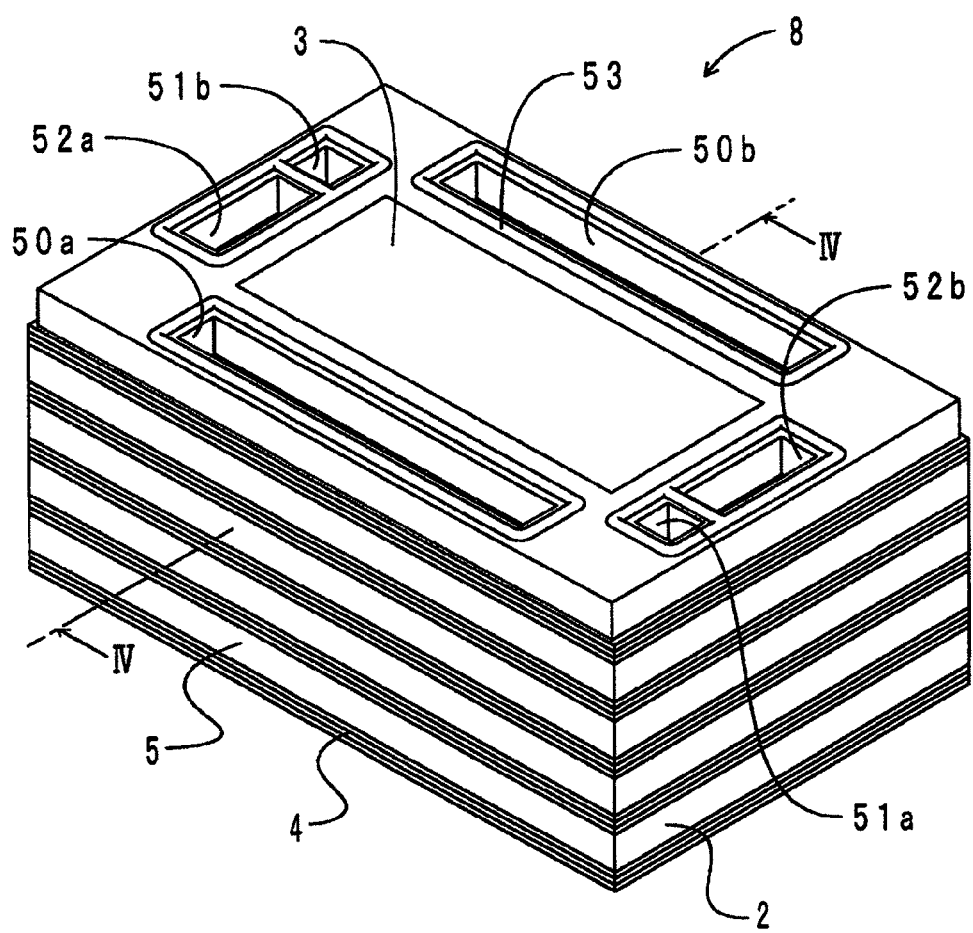
FIG. 2 is a perspective view of the module.
Figure 3:
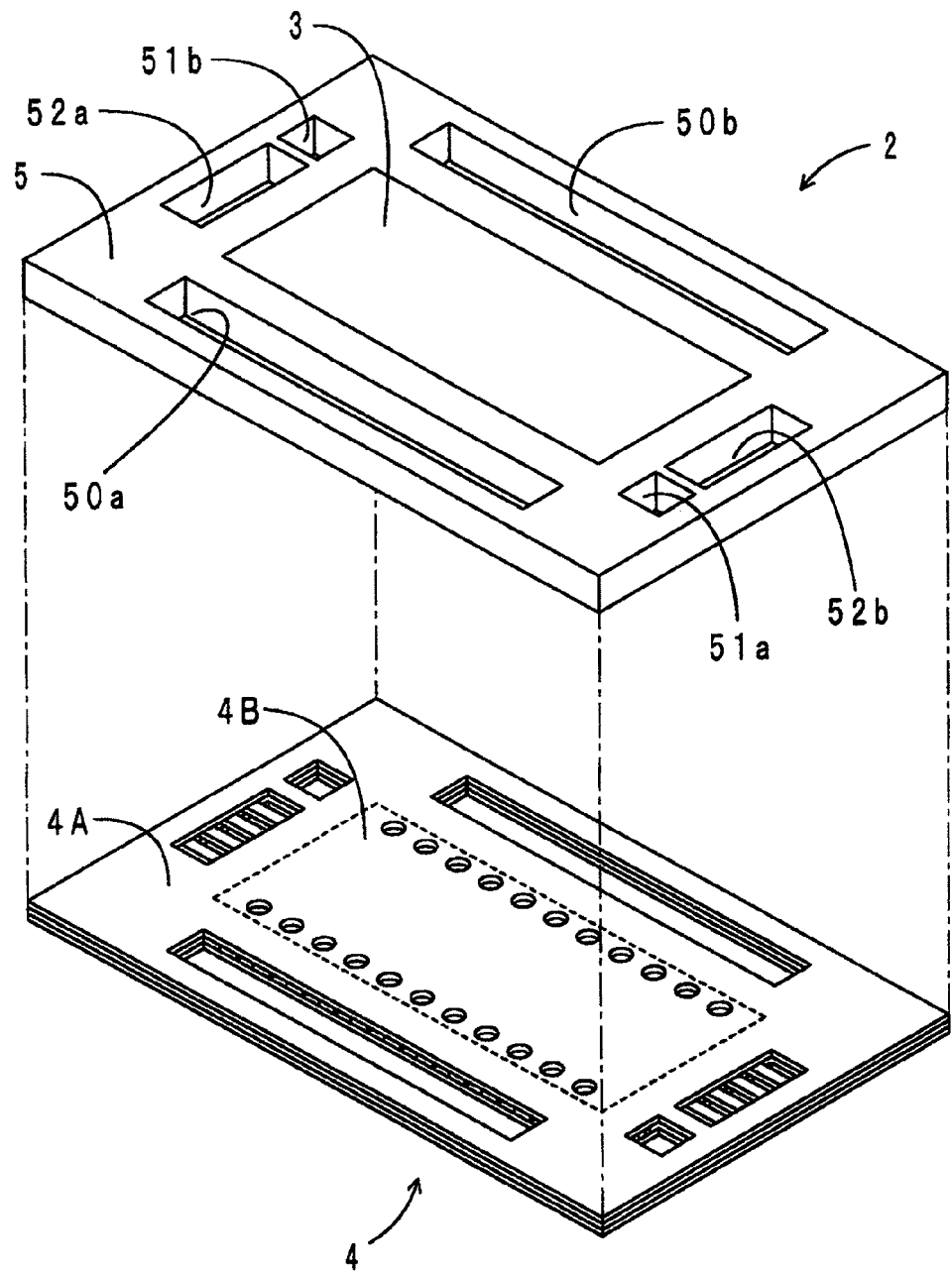
FIG. 3 is an exploded perspective view of a cell assembly structuring the module.
Figure 4:
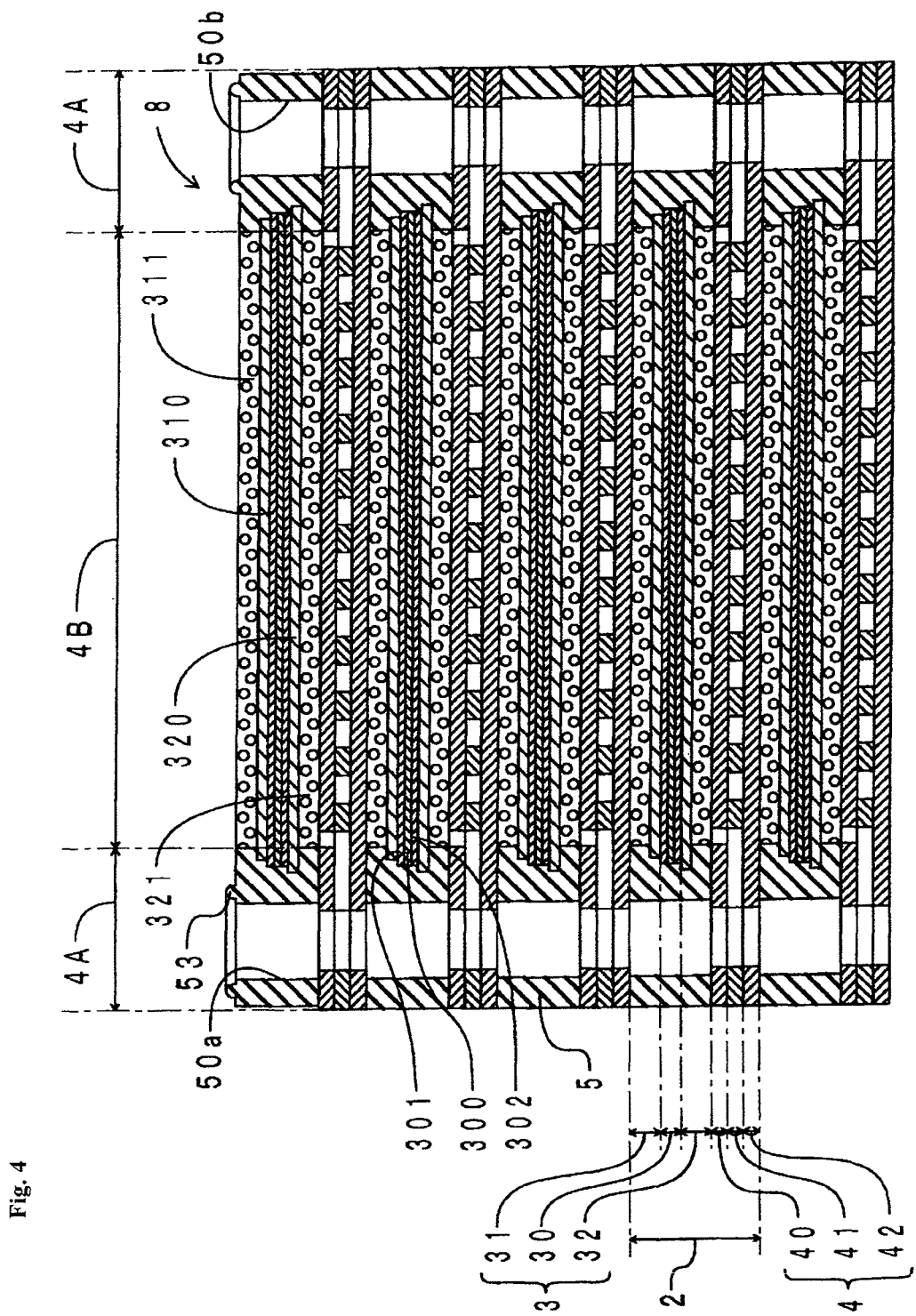
FIG. 4 is a IV-IV cross-sectional view FIG. 2.

[Configuration of Fuel Cell Module]
The configuration of a fuel cell module manufactured in accordance with the manufacturing method of a fuel cell module according to the present embodiment will be described next. FIG. 2 is a perspective view of a fuel cell module manufactured in accordance with the manufacturing method of a fuel cell module according to the present embodiment. FIG. 3 is an exploded perspective view of a cell assembly forming the module. FIG. 4 is a IV-IV cross-sectional view of FIG. 2. As shown in FIGS. 2 to 4, the module 8 is formed by stacking five cell assemblies 2. Each cell assembly 2 includes an electrode member 3, a separator 4, and a seal member 5.

The electrode member 3 includes an MEA 30, an anode porous layer 31, and a cathode porous layer 32. The MEA 30 is formed from an electrolyte membrane 300, an anode catalyst layer 301, and a cathode catalyst layer 302.

The electrolyte membrane 300 is a perfluorosulfonic acid film, and has a thin rectangular plate shape. The anode catalyst layer 301 has a thin rectangular plate shape, and is disposed to cover the top side of the electrolyte membrane 300. The anode catalyst layer 301 contains carbon particles that carry platinum. The cathode catalyst layer 302 has the same structure as the anode catalyst layer 301, and is disposed to cover the bottom side of the electrolyte membrane 300.

The anode porous layer 31 includes a gas diffusion layer 310 and a gas flow path layer 311. The gas diffusion layer 310 is made of carbon paper, and has a thin rectangular plate shape. The gas diffusion layer 310 is disposed on the top side of the anode catalyst layer 301 of the MEA 30. The porosity of the gas diffusion layer 310 is approximately 60%. The gas flow path layer 311 is made of sintered foam metal, and has a thin rectangular plate shape. The gas flow path layer 311 is disposed on the top side of the gas diffusion layer 310. The porosity of the gas flow path layer 311 is approximately 70 to 80%. The gas diffusion layer 310 has a generally similar shape to the MEA 30. The gas diffusion layer 310 is smaller than the MEA 30. Namely, the area of the gas diffusion layer 310 is smaller than the area of the MEA 30. Therefore, the peripheral edge portion of the gas diffusion layer 310 is disposed more inward than the peripheral edge portion of the MEA 30. Also, the gas flow path layer 311 has a generally similar shape to the gas diffusion layer 310. The area of the gas flow path layer 311 is smaller than the area of the gas diffusion layer 310. Therefore, the peripheral edge portion of the gas flow path layer 311 is disposed more inward than the peripheral edge portion of the gas diffusion layer 310.

The cathode porous layer 32 includes a gas diffusion layer 320 and a gas flow path layer 321. The gas diffusion layer 320 has the same structure as the gas diffusion layer 310, and is disposed on the bottom side of the cathode catalyst layer 302 of the MEA 30. The gas diffusion layer 320 has a generally similar shape to the MEA 30. The gas diffusion layer 320 is larger than the MEA 30. Namely, the area of the gas diffusion layer 320 is larger than the area of the MEA 30. Therefore, the peripheral edge portion of the gas diffusion layer 320 is disposed more outward than the peripheral edge portion of the MEA 30. The gas flow path layer 321 has the same structure as the gas flow path layer 311, and is disposed on the bottom side of the gas diffusion layer 320. The gas flow path layer 321 has a generally similar shape to the MEA 30. The area of the gas flow path layer 321 is smaller than the area of the MEA 30. Therefore, the peripheral edge portion of the gas flow path layer 321 is disposed more inward than the peripheral edge portion of the MEA 30. The shape and area of the gas flow path layer 311 are identical to the shape and area of the gas flow path layer 321. Therefore, the peripheral edge portions of the gas flow path layer 311 and the gas flow path layer 321 are aligned with each other as viewed from above.

The separator 4 has a rectangular plate shape, and is arranged to be stacked below the electrode member 3. The separator 4 is formed by stacking a cathode plate 40, an intermediate plate 41, and an anode plate 42 in this order from the top. The cathode plate 40, the intermediate plate 41, and the anode plate 42 are each made of stainless steel. The cathode plate 40 is disposed to contact the bottom side of the gas flow path layer 321. The anode plate 42 is in contact with the top side of another cell assembly 2 that is stacked below the cell assembly 2. The respective plates 40, 41, 42 structuring the separator 4 are each formed with a plurality of through holes. Accordingly, flow paths for air, hydrogen, and coolant are formed inside the separator 4.

As shown in FIGS. 3 and 4, a seal member arrangement portion 4A and an electrode member arrangement portion 4B are defined on the top side of the cathode plate 40. The electrode member arrangement portion 4B has a rectangular shape. The seal member arrangement portion 4A has a rectangular frame shape. The seal member arrangement portion 4A is disposed on the outer side of the electrode member arrangement portion 4B in the planar direction (horizontal direction). The gas flow path layer 321 is disposed in the electrode member arrangement portion 4B.

The seal member 5 has a rectangular frame shape, and is disposed in the seal member arrangement portion 4A of the separator 4. The seal member 5 is formed from a crosslinked item of solid rubber containing ethylene-propylene-diene rubber (EPDM) as a rubber component. The seal member 5 coats the peripheral edge portion of the electrode member 3, and is bonded to the cathode plate 40 and the anode plate 42 of the separator 4 that is in contact with the seal member 5. Through holes 50a, 50b, 51a, 51 b, 52a, 52b are formed along the four sides of the seal member 5. The through hole 50a corresponds to the air supply hole 10a, the through hole 50b corresponds to the air discharge hole 10b, the through hole 51a corresponds to the hydrogen supply hole 11a, the through hole 51b corresponds to the hydrogen discharge hole 11b, the through hole 52a corresponds to the coolant supply hole 12a, and the through hole 52b corresponds to the coolant discharge hole 12b. A convex portion 53 is formed on the top side of the seal member 5 in the uppermost cell assembly 2 so as to surround the respective through holes 50a, 50b, 51a, 51b, 52a, 52b. During assembly of the fuel cell 1 by stacking the modules 8, the convex portion 53 is pressed and deformed by a fastening force in the stacking direction. Accordingly, a seal line is formed around the respective through holes 50a, 50b, 51a, 51b, 52a, 52b, which suppresses the leakage of air, hydrogen, and coolant.

[Manufacturing Method of Fuel Cell Module]

The manufacturing method of a fuel cell module according to the present embodiment will be described next. The manufacturing method of a fuel cell module according to the present embodiment includes a preliminary production step, an incorporation step, a member arrangement step, and an integration step. The manufacturing method of a fuel cell module according to the present embodiment is included in a first manufacturing method of a fuel cell module according to the present invention.

Figure 5:
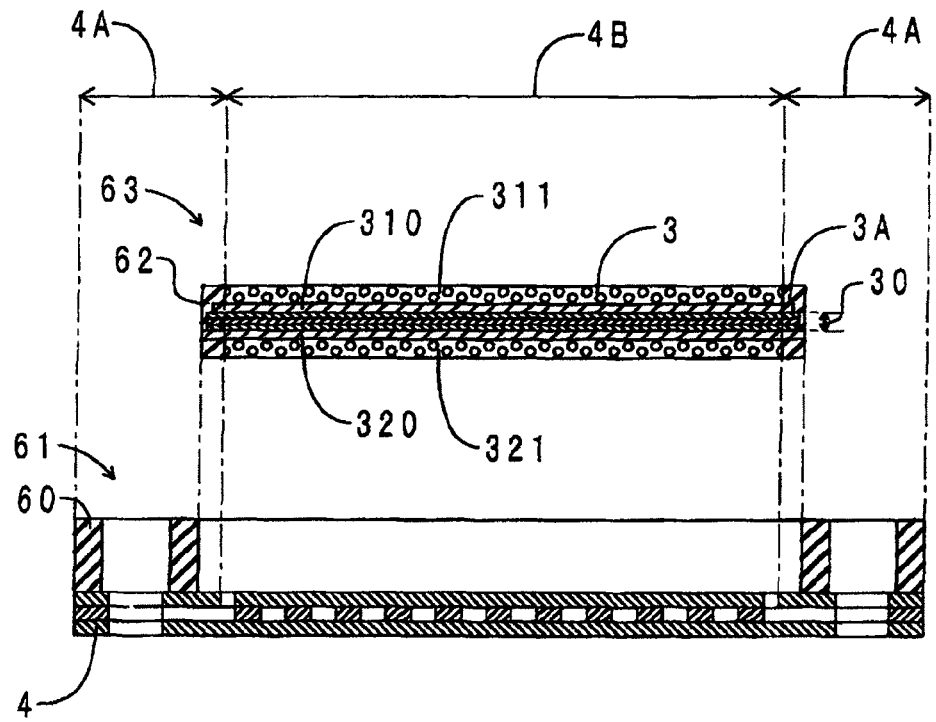
FIG. 5 is a cross-sectional view showing a state before incorporation of an inner temporary assembly and an outer temporary assembly.

First, the preliminary production step will be described. In this step, as shown in FIG. 5 mentioned later, an outer divided body 60 having a frame shape is formed in the seal member arrangement portion 4A of the separator 4 to produce an outer temporary assembly 61, and an inner divided body 62 having a frame shape is formed in the peripheral edge portion of the electrode member 3 to produce an inner temporary assembly 63. The following description is made with reference to FIG. 5 mentioned later.

Firstly, the outer temporary assembly 61 is preformed. The separator 4 is first disposed in a predetermined preforming die. The outer divided body 60 is next disposed in the seal member arrangement portion 4A of the separator 4. The outer divided body 60 is formed from an uncrosslinked item of solid rubber containing EPDM as a rubber component. After the die is closed, the preforming die is heated to a temperature at which the outer divided body 60 is not crosslinked. This allows the outer divided body 60 and the separator 4 to be bonded to each other. Accordingly, the outer temporary assembly 61 in which the outer divided body 60 having a frame shape is formed in the seal member arrangement portion 4A of the separator 4 is obtained.

Secondly, the inner temporary assembly 63 is preformed. The electrode member 3 which has been produced in advance is first disposed in a predetermined preforming die. The electrode member 3 has a stepped portion 3A that is stepped as viewed in cross section in the thickness direction in the peripheral edge portion. The inner divided body 62 is next disposed along the stepped portion 3A of the electrode member 3. The inner divided body 62 is formed from an uncrosslinked item of solid rubber containing EPDM as a rubber component. The inner divided body 62 has been formed in a predetermined shape in advance. The end surface of the gas diffusion layer 320 in the thickness direction is not coated by the inner divided body 62 but exposed to the outside. After the die is closed, the preforming die is heated to a temperature at which the inner divided body 62 is not crosslinked. This allows the inner divided body 62 and the electrode member 3 to be bonded to each other. Accordingly, the inner temporary assembly 63 in which the inner divided body 62 having a frame shape is formed in the peripheral edge portion of the electrode member 3 is obtained.

Figure 6:
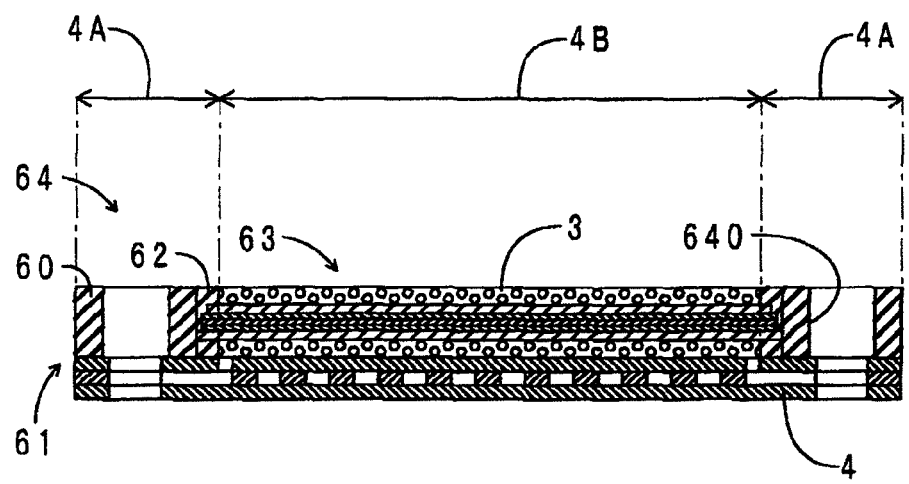
FIG. 6 is a cross-sectional view showing a state after the incorporation of the inner temporary assembly and the outer temporary assembly.

The incorporation step will be described next. FIG. 5 is a cross-sectional view showing a state before incorporation of the inner temporary assembly and the outer temporary assembly. FIG. 6 is a cross-sectional view showing a state after the incorporation of the inner temporary assembly and the outer temporary assembly. In this step, the inner temporary assembly 63 is fitted into the frame of the outer temporary assembly 61 to produce a cell assembly temporary assembly 64.

The outer temporary assembly 61 is first disposed with the outer divided body 60 facing upward. The inner temporary assembly 63 is next disposed in the frame of the outer temporary assembly 61. In this state, the gas flow path layer 321 of the electrode member 3 is in contact with the electrode member arrangement portion 4B of the separator 4. Also, the inner divided body 62 and the outer divided body 60 are incorporated with each other. Accordingly, the cell assembly temporary assembly 64 is obtained. Also, as shown in FIG. 6, the cell assembly temporary assembly 64 has a penetration hole 640 that penetrates in the thickness direction of the electrode member 3.

Figure 7:
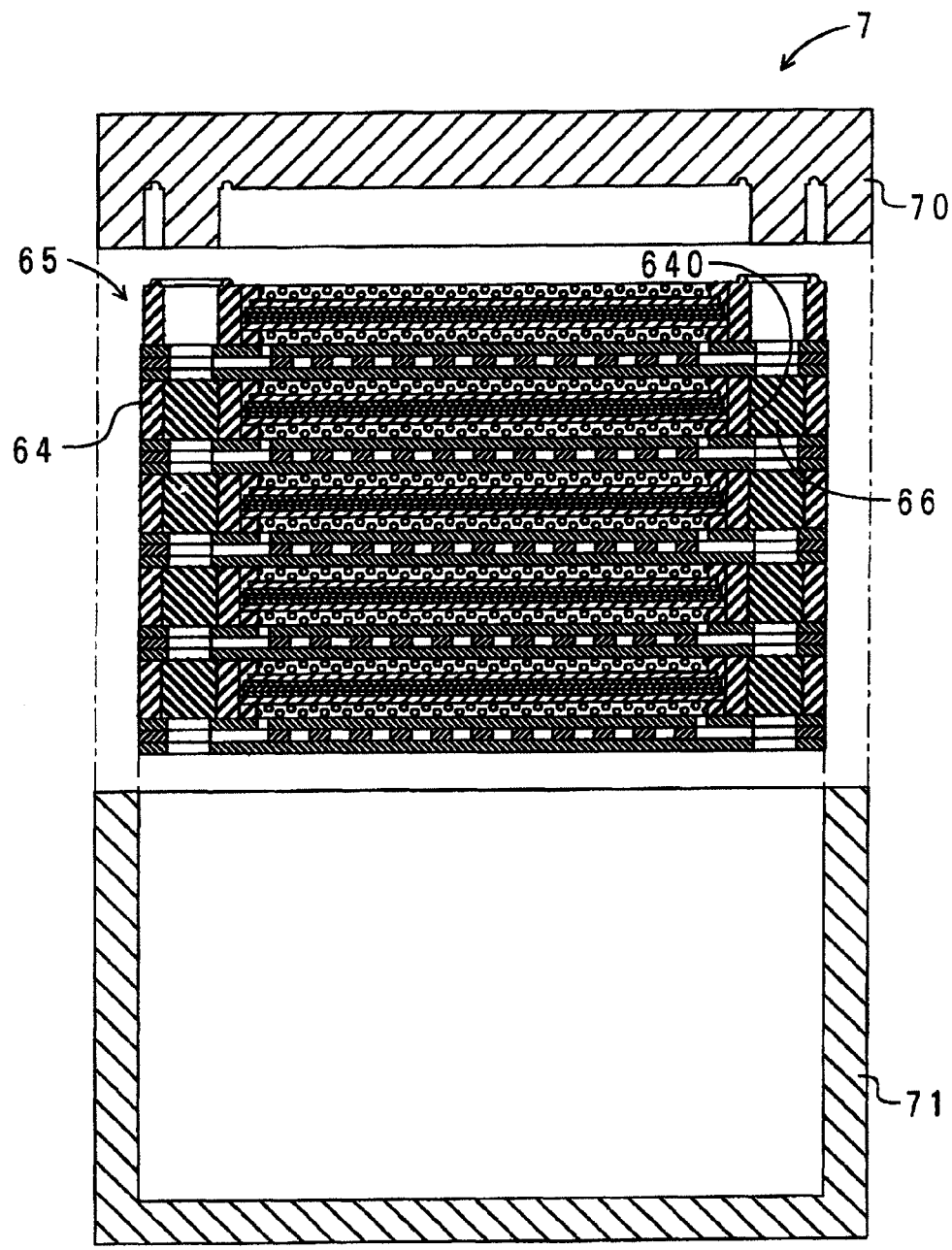
FIG. 7 is a cross-sectional view of a forming die for use in the manufacturing method of a fuel cell module according to the first embodiment in an open state.
Figure 8:
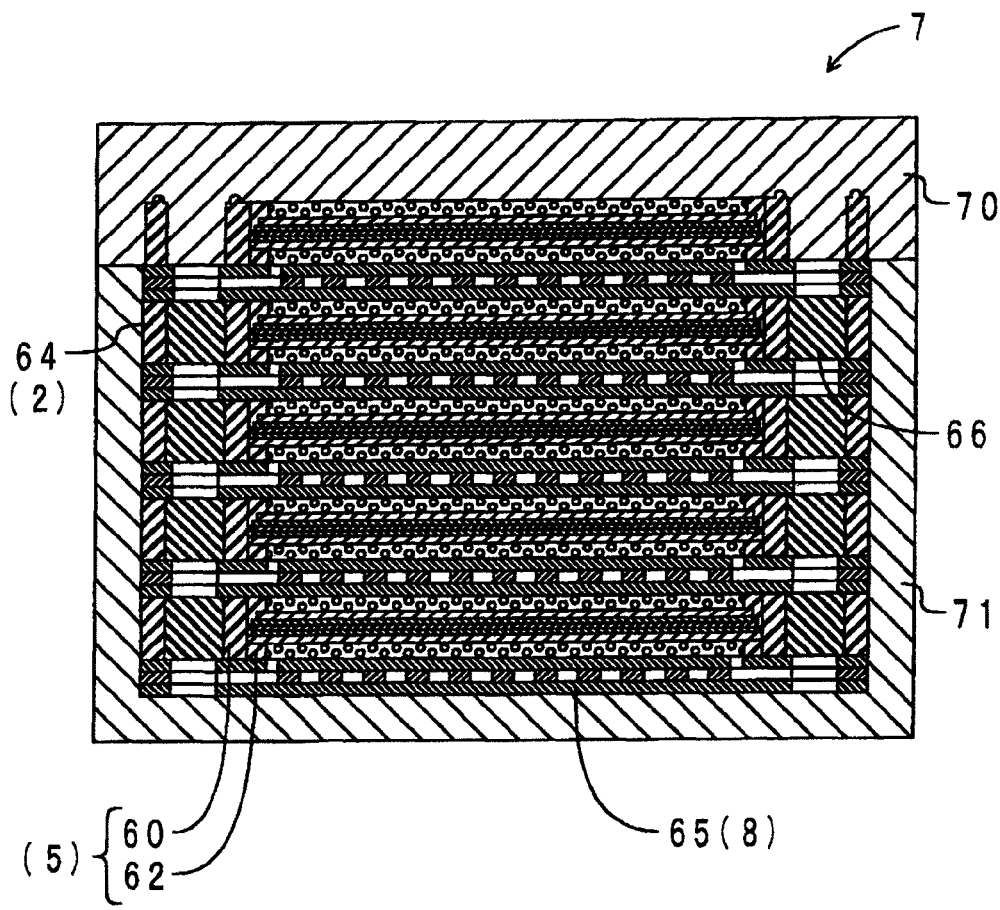
FIG. 8 is a cross-sectional view of the forming die in a closed state.

The member arrangement step will be described next. FIG. 7 is a cross-sectional view of the forming die in an open state. FIG. 8 is a cross-sectional view of the forming die in a closed state.

In this step, a cell assembly stack 65 obtained by stacking the cell assembly temporary assemblies 64 produced in the preceding step (incorporation step) is disposed in a forming die 7. As shown in FIG. 7, the forming die 7 includes a first forming die 70 and a second forming die 71.

A plug 66 is first inserted into each penetration hole 640 of the cell assembly temporary assemblies 64 to be stacked. The plug 66 is formed from a fluorine resin. The cell assembly temporary assemblies 64 are next stacked to produce the cell assembly stack 65. Subsequently, the cell assembly stack 65 is disposed inside the second forming die 71. Thereafter, the first forming die 70 and the second forming die 71 are aligned to close the die.

The integration step will be described next. In this step, the forming die 7 is pressurized and heated in the closed state to crosslink the uncrosslinked items (see FIG. 8 mentioned earlier). As a result of the heating, the outer divided body 60 and the inner divided body 62 are integrated with each other to form the seal member 5. The formed seal member 5 seals the peripheral edge portion of the electrode member 3, and integrates the electrode member 3 and the separator 4 with each other. Accordingly, the cell assembly 2 is produced from the cell assembly temporary assembly 64. Also, the seal member 5 integrates the cell assembly temporary assemblies 64 which are adjacent in the stacking direction with each other to produce the module 8 from the cell assembly stack 65. After the die is removed, each plug 66 is removed to obtain the module 8.

[Manufacturing Method of Fuel Cell]

The manufacturing method of a fuel cell according to the present embodiment will be described next with reference to FIG. 1 mentioned earlier. Three modules 8 are first stacked in the thickness direction of the electrode member 3. The end plates 13, 14 are next respectively disposed on both ends in the stacking direction. The end plates 13, 14 are fastened to the stacked modules 8 by applying a predetermined fastening force from both sides in the stacking direction to obtain the fuel cell 1.

[Operations and Effects]

The operations and effects of the manufacturing method of a fuel cell module and the manufacturing method of a fuel cell according to the present embodiment will be described below. According to the manufacturing method of a fuel cell module of the present embodiment, the seal member 5 is formed from a crosslinked item of solid rubber containing EPDM as a rubber component. Since solid rubber is used, the cell assembly temporary assembly 64 which is formed from an uncrosslinked item of solid rubber can be produced in advance. Consequently, the module 8 can be manufactured conveniently and efficiently by stacking the cell assembly temporary assemblies 64 and performing integral molding.

Since solid rubber is used, no issues are caused that would occur in a case where injection molding was performed using liquid rubber. That is, according to the manufacturing method of a fuel cell module of the present embodiment, there is no need for special treatment for regulating the amount of liquid rubber for impregnation. Furthermore, there is no risk of the electrolyte membrane 300 being deformed by the injection pressure of liquid rubber.

The seal member 5 has high tensile strength and elongation. Consequently, the seal member 5 easily follows the expansion and contraction of the electrolyte membrane 300, and has high durability. Even without the use of an adhesive agent, the seal member 5, the electrode member 3, and the separator 4 can be strongly bonded to each other. Further, the seal member 5 is not prone to lose its adhesiveness even in the operation environment of the fuel cell 1. Therefore, the seal member 5 secures good sealability during operation. Thus, according to the manufacturing method of a fuel cell of the present embodiment, the fuel cell 1 which operates stably over a long period can be manufactured.

The area of the MEA 30 is larger than the area of the gas diffusion layer 310. Hence, even if the seal member 5 does not sufficiently coat the end portion of the gas diffusion layer 310, the MEA 30 and the seal member 5 coating the peripheral edge portion of the MEA 30 act as a barrier, which suppresses the leakage of gas to the end side of the gas diffusion layer 320.

According to the manufacturing method of a fuel cell module of the present embodiment, in the incorporation step, the inner temporary assembly 63 can be disposed using the position of the outer divided body 60 as a reference. Namely, the inner temporary assembly 63 may be disposed such that the outer divided body 60 and the inner divided body 62 are incorporated with each other. This allows easy positioning of the electrode member 3. Moreover, the electrode member 3 is fixed by the inner divided body 62 and the outer divided body 60. Also, the separator 4 is fixed by the inner divided body 62 and the outer divided body 60. Therefore, the electrode member 3 and the separator 4 are not easily misaligned during stacking of the cell assembly temporary assemblies 64. In addition, the seal member 5 is formed by incorporating the outer divided body 60 and the inner divided body 62 with each other. Since the seal member 5 is structured by two divided bodies, the seal member 5 can be easily produced to match the shape of the peripheral edge portion of the electrode member 3.

According to the manufacturing method of a fuel cell module of the present embodiment, the entire cell assembly stack 65 in which the cell assembly temporary assemblies 64 are stacked is pressurized and heated to crosslink the uncrosslinked items (the inner divided body 62 and the outer divided body 60). Therefore, the total crosslinking time can be reduced compared to a case where the cell assembly temporary assemblies 64 are subjected to crosslinking one by one. Hence, the modules 8 can be produced with high efficiency. Thus, according to the manufacturing method of a fuel cell module of the present embodiment, the electrode member 3 and the separator 4 can be positioned easily, and misalignment of the electrode member 3 and the separator 4 can be suppressed. Consequently, the modules 8 can be manufactured conveniently and efficiently.

According to the manufacturing method of a fuel cell of the present embodiment, the fuel cell 1 can be easily assembled by just stacking the modules 8. Consequently, according to the manufacturing method of a fuel cell of the present embodiment, the fuel cell 1 can be produced with improved efficiency. In addition, the module 8 can be individually taken out from the fuel cell 1 as necessary. Hence, the fuel cell 1 can be easily inspected and repaired.

Second Embodiment

The manufacturing method of a fuel cell module and the manufacturing method of a fuel cell according to the present embodiment are different from those according to the first embodiment in that a seal member preform is integrally formed to match the shape of the peripheral edge portion of the electrode member. Accordingly, the difference will be mainly described herein.

Figure 9:
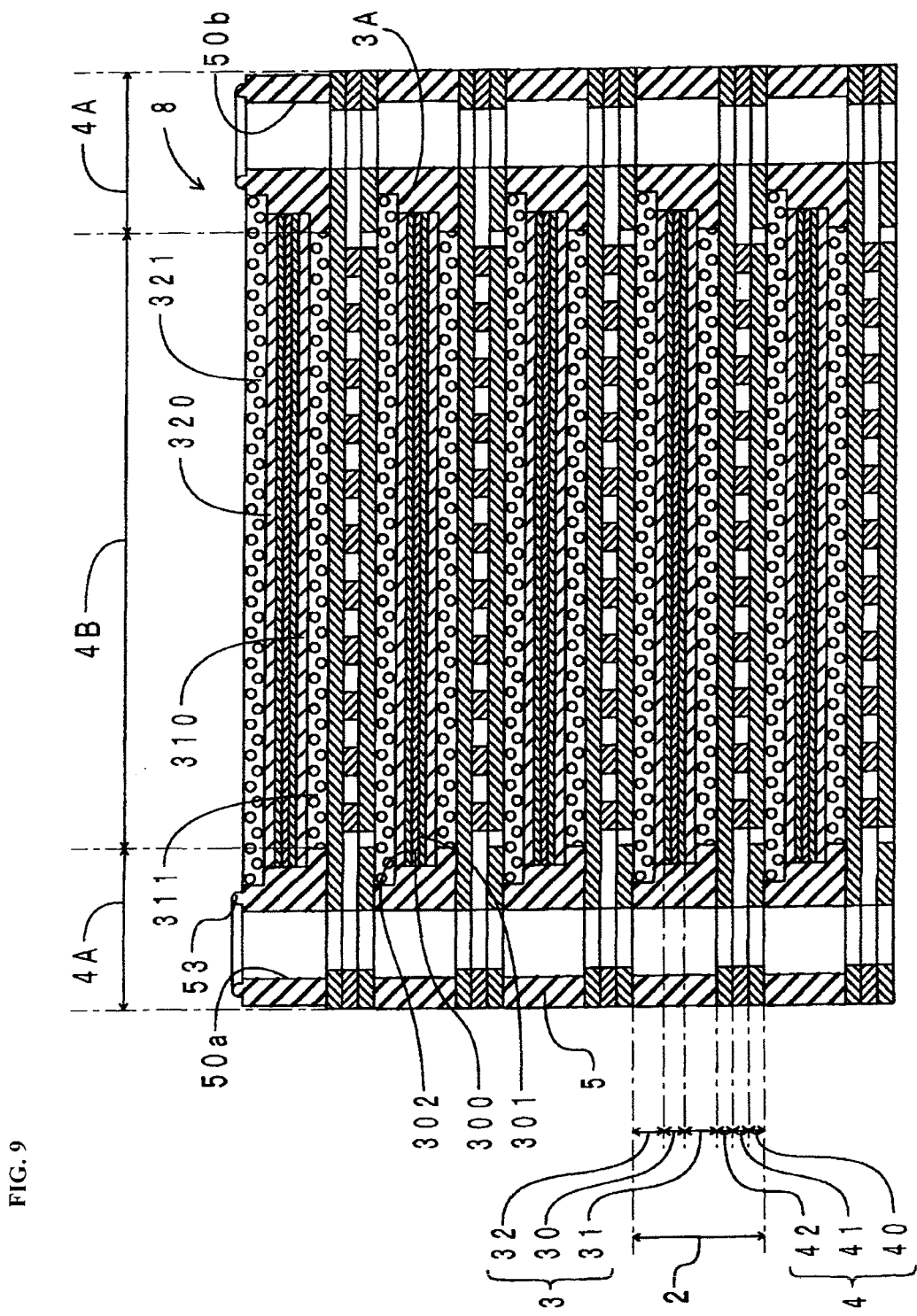
FIG. 9 is a cross-sectional view of a fuel cell module manufactured in accordance with a manufacturing method of a fuel cell module according to a second embodiment.

First, the configuration of a fuel cell module manufactured in accordance with the manufacturing method of a fuel cell module according to the present embodiment will be described. FIG. 9 is a cross-sectional view of a fuel cell module manufactured in accordance with the manufacturing method of a fuel cell module according to the present embodiment. Components in FIG. 9 corresponding to those in FIG. 4 are denoted by the same reference symbols. As shown in FIG. 9, the module 8 is formed by stacking five cell assemblies 2. Each cell assembly 2 includes an electrode member 3, a separator 4, and a seal member 5.

The electrode member 3 is formed from an MEA 30, a gas diffusion layer 310 and a gas flow path layer 311 (an anode porous layer 31), and a gas diffusion layer 320 and a gas flow path layer 321 (a cathode porous layer 32). The shape and area of the gas diffusion layers 310, 320 are identical to the shape and area of the MEA 30. Therefore, the peripheral edge portions of the gas diffusion layers 310, 320 are aligned with the peripheral edge portion of the MEA 30 as viewed from above. Meanwhile, the gas flow path layer 311 and the gas flow path layer 321 have a generally similar shape to the MEA 30. The area of the gas flow path layer 311 on the anode side is smaller than the area of the MEA 30. Therefore, the peripheral edge portion of the gas flow path layer 311 is disposed more inward than the peripheral edge portions of the MEA 30 and the gas diffusion layers 310, 320. Conversely, the area of the gas flow path layer 321 on the cathode side is larger than the area of the MEA 30. Therefore, the peripheral edge portion of the gas flow path layer 321 is disposed more outward than the peripheral edge portions of the MEA 30 and the gas diffusion layers 310, 320. Thus, the cross section of the peripheral edge portion of the electrode member 3 in the thickness direction (up-down direction) has a stepped shape that projects increasingly outwardly from the bottom to the top. Namely, the electrode member 3 has a stepped portion 3A that is stepped as viewed in cross section in the thickness direction in the peripheral edge portion.

The separator 4 is arranged to be stacked below the electrode member 3. The separator 4 is formed by stacking an anode plate 42, an intermediate plate 41, and a cathode plate 40 in this order from the top. The anode plate 42 is disposed to contact the bottom side of the gas flow path layer 311. The cathode plate 40 is in contact with the top side of another cell assembly 2 that is stacked below the cell assembly 2. A seal member arrangement portion 4A and an electrode member arrangement portion 413 are defined on the top side of the anode plate 42. The electrode member arrangement portion 4B has a rectangular shape. The seal member arrangement portion 4A has a rectangular frame shape. The seal member arrangement portion 4A is disposed on the outer side of the electrode member arrangement portion 4B in the planar direction (horizontal direction). The gas flow path layer 311 is disposed in the electrode member arrangement portion 4B.

The seal member 5 has a rectangular frame shape, and is disposed in the seal member arrangement portion 4A of the separator 4. The seal member 5 coats the peripheral edge portion of the electrode member 3, and coats the top side of the separator 4.

The manufacturing method of a fuel cell module according to the present embodiment will be described next. The manufacturing method of a fuel cell module according to the present embodiment includes a preliminary production step, an incorporation step, a member arrangement step, and an integration step. The manufacturing method of a fuel cell module according to the present embodiment is included in a second manufacturing method of a fuel cell module according to the present invention.

Figure 10:
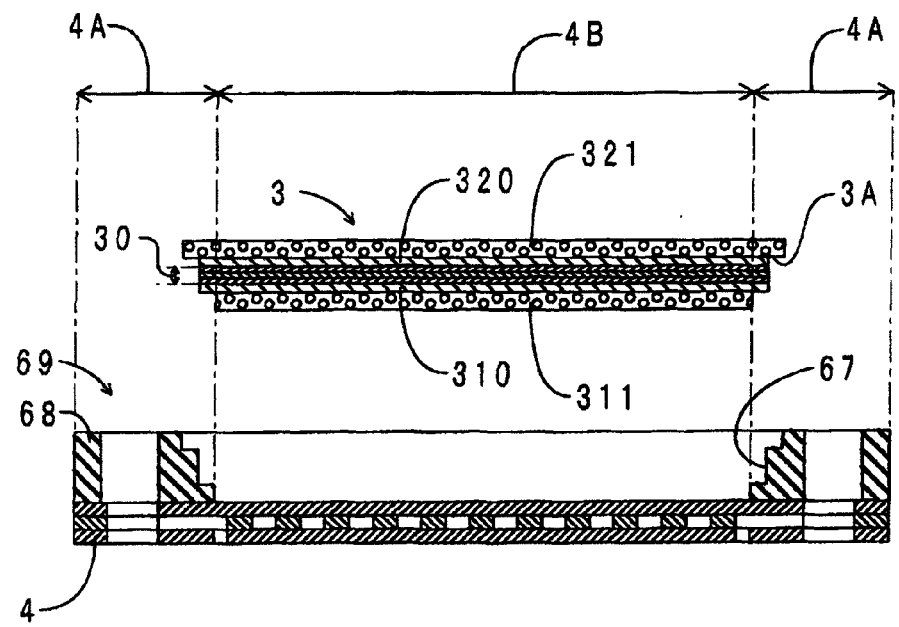
FIG. 10 is a cross-sectional view showing a state before incorporation of an electrode member and a seal member temporary assembly.

First, the preliminary production step will be described. In this step, as shown in FIG. 10 mentioned later, a seal member preform 68 having a frame shape is formed in the seal member arrangement portion 4A of the separator 4 to produce a seal member temporary assembly 69. The following description is made with reference to FIG. 10 mentioned later.

The seal member preform 68 is formed by injection molding of an uncrosslinked item of solid rubber containing EPDM as a rubber component. The separator 4 is first disposed in a predetermined preforming die. The preforming die is next closed. In the closed state, a cavity corresponding to the shape of the seal member preform 68 is defined. Subsequently, an uncrosslinked item of solid rubber is injected from the injection molding machine into the cavity. After that, the preforming die is removed to obtain the seal member temporary assembly 69. As shown in FIG. 10, the inner side of the frame of the seal member preform 68 has a stepped shape that projects increasingly inwardly from the top to the bottom. Namely, a die-symmetric stepped portion 67 having a shape that matches the stepped portion 3A of the electrode member 3 is formed on the inner side of the frame of the seal member preform 68.

Figure 11:
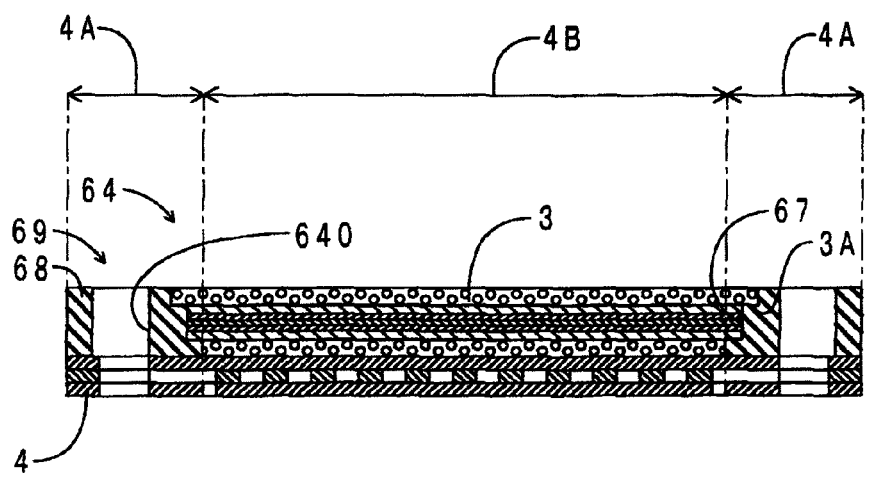
FIG. 11 is a cross-sectional view showing a state after the incorporation of the electrode member and the seal member temporary assembly.

The incorporation step will be described next. FIG. 10 is a cross-sectional view showing a state before incorporation of the electrode member and the seal member temporary assembly. FIG. 11 is a cross-sectional view showing a state after the incorporation of the electrode member and the seal member temporary assembly. In this step, the electrode member 3 is fitted into the frame of the seal member temporary assembly 69 to produce a cell assembly temporary assembly 64.

The seal member temporary assembly 69 is first disposed with the seal member preform 68 facing upward. The electrode member 3 which has been produced in advance is next disposed in the frame of the seal member temporary assembly 69. In this state, the stepped portion 3A at the peripheral edge portion of the electrode member 3 is in surface contact with the die-symmetric stepped portion 67 of the seal member preform 68. Also, the gas flow path layer 311 of the electrode member 3 is in contact with the electrode member arrangement portion 4B of the separator 4. Accordingly, the cell assembly temporary assembly 64 is obtained. Also, as shown in FIG. 11, the cell assembly temporary assembly 64 has a penetration hole 640 that penetrates in the thickness direction of the electrode member 3.

Figure 12:
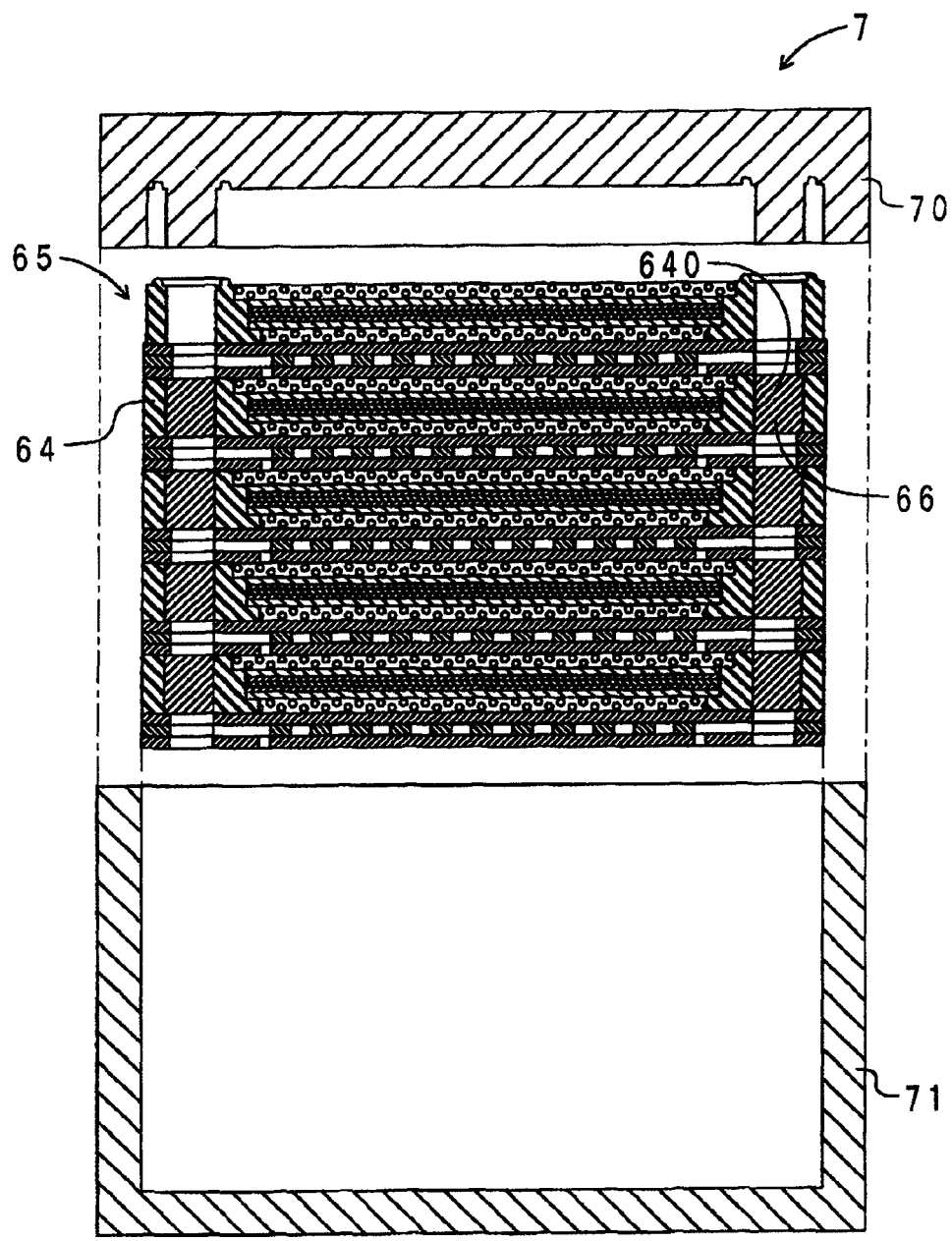
FIG. 12 is a cross-sectional view of a forming die for use in the manufacturing method of a fuel cell module according to the second embodiment in an open state.
Figure 13:
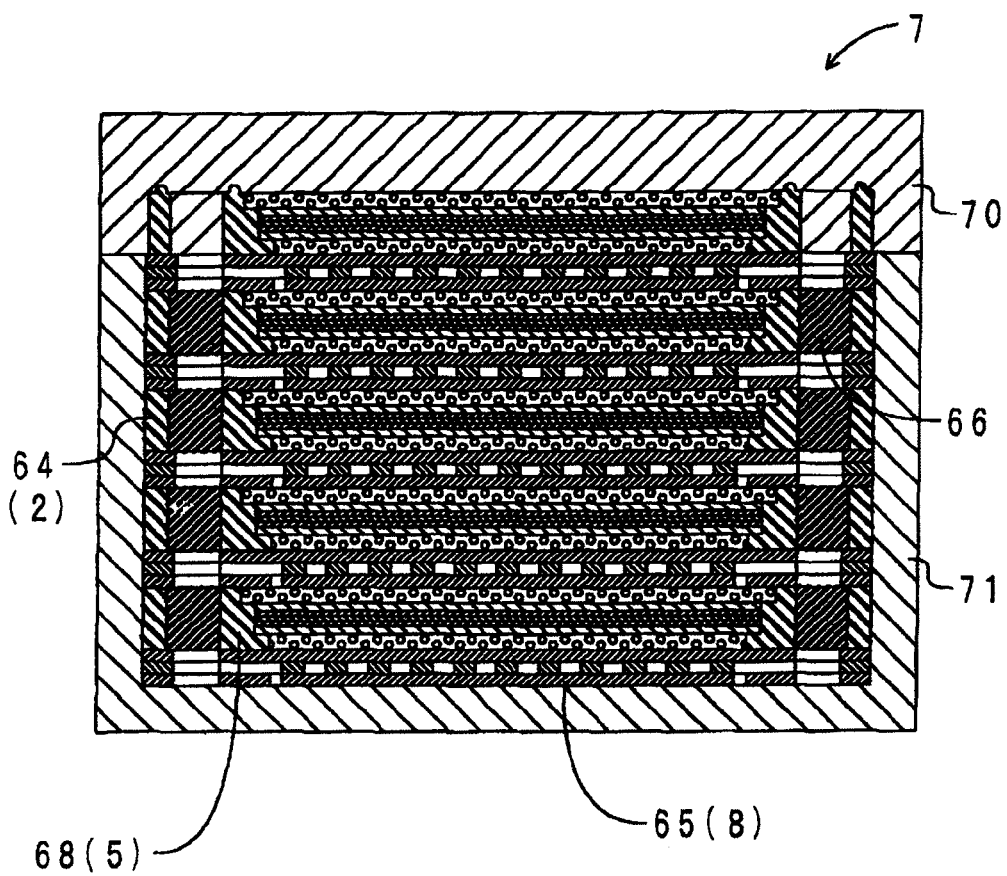
FIG. 13 is a cross-sectional view of the forming die in a closed state.

The member arrangement step will be described next. FIG. 12 is a cross-sectional view of the forming die in an open state. FIG. 13 is a cross-sectional view of the forming die in a closed state.

In this step, a cell assembly stack 65 obtained by stacking the cell assembly temporary assemblies 64 produced in the preceding step (incorporation step) is disposed in a forming die 7. As shown in FIG. 12, the forming die 7 includes a first forming die 70 and a second forming die 71.

A plug 66 is first inserted into each penetration hole 640 of the cell assembly temporary assemblies 64 to be stacked. The plug 66 is formed from a fluorine resin. The cell assembly temporary assemblies 64 are next stacked to produce the cell assembly stack 65. Subsequently, the cell assembly stack 65 is disposed inside the second forming die 71. Thereafter, the first forming die 70 and the second forming die 71 are aligned to close the die.

The integration step will be described next. In this step, the forming die 7 is pressurized and heated in the closed state to crosslink the uncrosslinked items (see FIG. 13 mentioned earlier). As a result of the heating, the seal member 5 is formed from the seal member preform 68. The formed seal member 5 seals the peripheral edge portion of the electrode member 3, and integrates the electrode member 3 and the separator 4 with each other. Accordingly, the cell assembly 2 is produced from the cell assembly temporary assembly 64. Also, the seal member 5 integrates the cell assembly temporary assemblies 64 which are adjacent in the stacking direction with each other to produce the module 8 from the cell assembly stack 65. After the die is removed, each plug 66 is removed to obtain the module 8.

The manufacturing method of a fuel cell according to the present embodiment is similar to the manufacturing method of a fuel cell according to the first embodiment. Thus, the description of the method is omitted herein.

Regarding common structures, the manufacturing method of a fuel cell module and the manufacturing method of a fuel cell according to the present embodiment have operations and effects similar to those of the manufacturing method of a fuel cell module and the manufacturing method of a fuel cell according to the first embodiment.

According to the manufacturing method of a fuel cell module of the present embodiment, the seal member preform 68 is integrally formed to match the shape of the peripheral edge portion of the electrode member 3 without being divided. Such a configuration is suitable for a case where it is difficult to produce the seal member preform 68 in a divided manner because, for example, the seal member 5 is so thin.

In the incorporation step, the electrode member 3 can be positioned by just placing the electrode member 3 in the frame of the seal member temporary assembly 69 such that the die-symmetric stepped portion 67 of the seal member preform 68 and the stepped portion 3A of the electrode member 3 are in contact with each other. Moreover, the electrode member 3 is fixed by the seal member preform 68. Also, the separator 4 is fixed by the seal member preform 68. Therefore, the electrode member 3 and the separator 4 are not easily misaligned during stacking of the cell assembly temporary assemblies 64. Thus, according to the manufacturing method of a fuel cell module of the present embodiment, the fuel cell module can be manufactured conveniently and efficiently.

Other Embodiments

A manufacturing method of a fuel cell module and a manufacturing method of a fuel cell according to embodiments of the present invention have been described above. However, the present invention is not limited to the embodiments described above. The present invention can also be implemented in various modified or improved forms that may occur to those skilled in the art.

That is, the respective elements structuring the fuel cell module are not limited to those of the above embodiments in terms of material, shape, size, and the like. For example, in the above embodiments, the separator has a three-layer structure. However, the structure of the separator is not limited thereto. In place of the perfluorosulfonic acid film, a perfluorophosphonic acid film, a perfluorocarboxylic acid film, or a hydrocarbon polymer film may be used for the electrolyte membrane. In the above embodiments, the pair of porous layers are structured from a gas diffusion layer and a gas flow path layer with different porosities. In such a case, the porosity, area, shape, thickness, and the like of both the layers may be set as appropriate. The pair of porous layers may be structured from a gas diffusion layer and a gas flow path layer with different average pore diameters. Furthermore, the pair of porous layers may be identical to or different from each other in terms of structure. For example, the cell assembly may be structured by stacking a separator and an electrode member having porous layers with different configurations as described in (1) and (2) below.

(1) [Gas Flow Path Layer/Gas Diffusion Layer/MEA/Gas Flow Path Layer/Separator]

According to an electrode member having the present configuration, a porous layer disposed on one side of the MEA in the thickness direction is formed from a gas diffusion layer that is disposed on one side of the MEA in the thickness direction and a gas flow path layer that is disposed on one side of the gas diffusion layer in the thickness direction and that has a greater porosity or average pore diameter than the gas diffusion layer. A porous layer disposed on the other side of the MEA in the thickness direction is formed from a gas flow path layer disposed on the other side of the MEA in the thickness direction.

(2) [Gas Flow Path Layer/Gas Diffusion Layer/MEA/Gas Diffusion Layer/Separator]

According to an electrode member having the present configuration, a porous layer disposed on one side of the MEA in the thickness direction is formed from a gas diffusion layer that is disposed on one side of the MEA in the thickness direction and a gas flow path layer that is disposed on one side of the gas diffusion layer in the thickness direction and that has a greater porosity or average pore diameter than the gas diffusion layer. A porous layer disposed on the other side of the MEA in the thickness direction is formed from a gas diffusion layer disposed on the other side of the MEA in the thickness direction.

In the above embodiments, for convenience of description, a fuel cell is structured by stacking three fuel cell modules. Each fuel cell module is structured by stacking five cell assemblies. However, the number of stacked fuel cell modules and the number of cell assemblies structuring each fuel cell module are not limited to those of the above embodiments.

In the first embodiment, the seal member is formed by incorporating the inner divided body and the outer divided body with each other. In this case, the thickness and material of the uncrosslinked items may be adjusted depending on the properties required of the seal region. For example, rubbers made of different materials may be used for each seal region. As in the above first embodiment, the inner divided body does not have to cover the entire peripheral edge portion of the electrode member (namely, the peripheral edge portion may be partially exposed to the outside). It is a matter of course that the inner divided body may entirely cover the peripheral edge portion of the electrode member. The inner divided body does not have to be in contact with the seal member arrangement portion of the separator. That is, it is only necessary that the seal member formed after incorporation entirely seals the peripheral edge portion of the electrode member and bonds the electrode member and the separator to each other.

In the above second embodiment, the seal member preform is produced by injection molding. However, the production method of the seal member preform is not limited to injection molding. For example, the seal member preform may be produced by press forming or the like. The seal member will be described in detail below.

[Seal Member]

In the fuel cell module of the present invention, a solid rubber with adhesiveness can be used as the seal member. The tensile product of the crosslinked item is preferably 1,500 MPa·% or more. The tensile product is defined as a product of tensile strength and breaking elongation, i.e., [tensile strength (MPa)×breaking elongation (%)]. A larger tensile product indicates that more energy is required to break. In the present description, values measured in accordance with JIS K6251 (2004) are employed for the tensile strength and breaking elongation. Measurements for tensile strength and breaking elongation were performed using No. 5 dumbbell specimens. In addition, the Mooney viscosity of the uncrosslinked item is preferably 40 M at 80° C. [40 ML (1+4) 80° C.] or more. The Mooney viscosity employs a value measured in accordance with JIS K6300-1 (2001).

More specifically, a solid rubber containing a rubber component such as the following may be used: ethylene-polypropylene rubber (EPM), ethylene-polypropylene-diene rubber (EPDM), acrylonitrile-butadiene rubber (NBR), hydrogenated acrylonitrile-butadiene rubber (H-NBR), styrene-butadiene rubber (SBR), and butadiene rubber (BR). The Type A durometer hardness of the crosslinked item (the seal member) is preferably 50 or more. Type A durometer hardness is a hardness measured by a Type A durometer as specified in JIS K6253 (2006).

For example, a rubber composition including the following contents of (A) to (D) is capable of crosslinking at a low temperature, and is well-suited in terms of high adhesive reliability and sealability of the crosslinked item. (A) One or more rubber components selected from a group consisting of ethylene-propylene rubber (EPM), ethylene-propylene-diene rubber (EPDM), acrylonitrile-butadiene rubber (NBR), and hydrogenated acrylonitrile-butadiene rubber (H-NBR); (B) a crosslinking agent selected from organic peroxides of which a 1-hour half-life period temperature is lower than or equal to 130° C.; (C) a crosslinking auxiliary agent; and (D) an adhesive component formed of at least one of a resorcinol compound together with a melamine compound and a silane coupling agent.

The crosslinking agent (B) is selected from organic peroxides of which the 1-hour half-life period temperature is lower than or equal to 130° C. Such organic peroxides include peroxyketal, peroxyester, diacyl peroxide, peroxydicarbonate, and the like. Particularly, at least one of the peroxyketal and the peroxyester of which the 1-hour half-life period temperature is higher than or equal to 100° C. is preferably employed, since crosslinking easily occurs at a temperature of approximately 130° C. and the rubber composition in which the crosslinking agent is added and kneaded can be handled easily. Particularly, one with a 1-hour half-life period temperature of 110° C. or higher is preferable.

Examples of the peroxyketal include n-butyl 4,4-di(t-butylperoxy)valerate, 2,2-di(t-butylperoxy)butane, 2,2-di(4, 4-di(t-butylperoxy)cyclohexyl)propane, 1,1-di(t-butylperoxy)cyclohexane, 1,1-di(t-hexylperoxy)cyclohexane, 1,1-di(t-hexylperoxy)-3,3,5-trimethylcyclohexane, 1,1-di(t-butylperoxy)-2-methylcyclohexane, and the like. Examples of the peroxyester include t-butyl peroxybenzoate, t-butyl peroxyacetate, t-hexyl peroxybenzoate, 2,5-dimethyl-2,5-di(benzoylperoxy)hexane, t-butyl peroxy-2-ethylhexyl monocarbonate, t-butyl peroxylaurate, t-butyl peroxyisopropylmonocarbonate, t-butyl peroxy-3,5,5-trimethylhexanoate, t-butyl peroxymaleic acid, t-hexyl peroxyisopropylmonocarbonate, and the like. Particularly, 1,1-di(t-butylperoxy) cyclohexane and t-butyl peroxyacetate are preferable, since the crosslinking agent using them is easily stored.

The amount of the crosslinking agent is preferably greater than or equal to 1 part by weight with respect to 100 parts by weight of the rubber component (A) described above so that the crosslinking reaction progresses sufficiently. In consideration of the storage stability of the prepared rubber composition, it is preferably less than or equal to 5 parts by weight.

The crosslinking auxiliary agent (C) may appropriately be selected according to the type of crosslinking agent (B) described above. Examples of the crosslinking auxiliary agent include a maleimide compound, triallyl cyanurate (TAC), triallyl isocyanurate (TALC), trimethylolpropane trimethacrylate (TMPT), and the like. Particularly, using the maleimide compound is preferable since the crosslinking speed becomes faster. In this case, the amount of the crosslinking auxiliary agent is preferably greater than or equal to 0.1 parts by weight with respect to 100 parts by weight of the rubber component (A) described above so that the crosslinking reaction progresses sufficiently. The amount of the crosslinking auxiliary agent is preferably less than or equal to 3 parts by weight, since the adhesive force decreases when the crosslinking reaction becomes too fast due to a large amount of the crosslinking auxiliary agent.

The adhesive component (D) is formed of at least one of the resorcinol compound together with the melamine compound and the silane coupling agent. That is, the adhesive component may be only the resorcinol compound and the melamine compound, or only the silane coupling agent. In the case where both the resorcinol compound together with the melamine compound and the silane coupling agent are included, the adhesive force is further improved.

Examples of the resorcinol compound include resorcin, modified resorcin-formaldehyde resin, resorcin-formaldehyde (RF) resin, and the like. A single one or a mixture of two or more of these may be used. Particularly, the modified resorcin-formaldehyde resin is preferable in terms of low volatility, low hygroscopicity, and high compatibility with rubber. Examples of the modified resorcin-formaldehyde resin include those represented by general formulas (1) to (3) below. One shown by the general formula (1) is particularly preferable. Note that reference symbol "R" indicates a hydrocarbon group in the general formula (1). Reference symbols "n" all indicate an integer in the general formulas (1) to (3).

[Chem. 1]

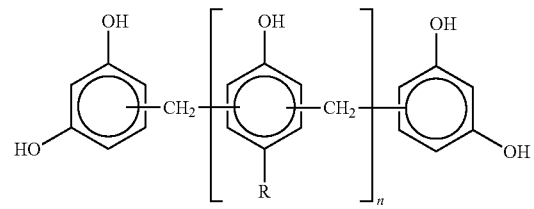

(1)

-continued

[Chem. 2]

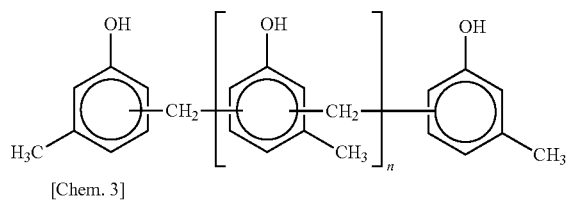

(2)

[Chem. 3]

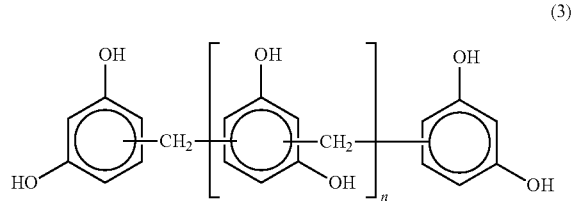

(3)

In order to obtain a desired adhesive force, the amount of the resorcinol compound is preferably greater than or equal to 0.1 parts by weight with respect to 100 parts by weight of the rubber component (A) described above. It is more preferably greater than or equal to 0.5 parts by weight. The amount of the resorcinol compound is preferably less than or equal to 10 parts by weight, since an excessive amount of the resorcinol compound causes a decrease in the properties of rubber. It is more preferably less than or equal to 5 parts by weight.

Examples of the melamine compound include a methylated formaldehyde melamine polymer, hexamethylene tetra/nine, and the like. One or more of these compounds may be used singly or in combination. These are decomposed by heat in the crosslinking, and supply formaldehyde to the system. Particularly, the methylated formaldehyde melamine polymer is preferable in terms of low volatility, low hygroscopicity, and high compatibility with rubber. The methylated formaldehyde melamine polymer represented by a general formula (4) below is preferable, for example. In the formula (4), reference symbol "n" indicates an integer. Particularly, a mixture including 43 to 44% by weight of a compound in which n=1, 27 to 30% by weight of a compound in which n=2, and 26 to 30% by weight of a compound in which n=3 in the general formula (4) is preferable.

[Chem. 4]

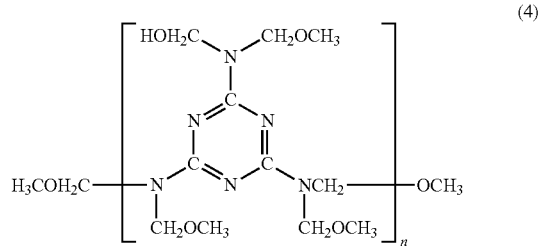

(4)

The compound ratio of the resorcinol compound and the melamine compound is preferably in a range of 1:0.5 to 1:2 by weight. It is more preferably in a range of 1:0.77 to 1:1.5. In the case where the compound ratio of the melamine compound with respect to the resorcinol compound is less than 0.5, the tensile strength, the stretch, and the like of the rubber tend to slightly decrease. On the other hand, when the compound ratio of the melamine compound exceeds 2, the adhesive force reaches a limit. Therefore, further increase in the compound ratio of the melamine compound leads to an increase in cost.

The silane coupling agent may appropriately be selected in consideration of the adhesiveness and the like from a group of compounds having an epoxy group, an amino group, a vinyl group, or the like as a functional group. Examples include vinyltrimethoxysilane, vinyltriethoxysilane, vinyl-tris(2-methoxyethoxy)silane, 3-methacryloxypropyltrimethoxysilane, 3-methacryloxypropyltriethoxysilane, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, N-2(aminoethyl)3-aminopropyltrimethoxysilane, 3-aminopropyltrimethoxysilane, N-phenyl-3-aminopropyltrimethoxysilane, and the like. One or more of these compounds may be used singly or in combination. Particularly, when one or more selected from the group of compounds having an epoxy group is used, the adhesive force is improved, and the adhesive force hardly decreases even in the operational environment of a fuel cell. Specifically, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, and the like are preferable.

In order to obtain a desired adhesive force, the amount of the silane coupling agent is preferably greater than or equal to 0.5 parts by weight with respect to 100 parts by weight of the rubber component (A) described above. It is more preferably greater than or equal to 2 parts by weight. An excessive amount of silane coupling agent leads to a decrease in the properties of rubber, and possibly a decrease in processability. Therefore, the amount of the silane coupling agent is preferably less than or equal to 10 parts by weight, and more preferably, less than or equal to 6 parts by weight.

The rubber composition may include various additives which are used as additives for general rubber other than the contents of (A) to (D) described above. For example, it is preferable to include carbon black as a reinforcing agent. The grade of the carbon black is not particularly limited, and may appropriately be selected from SAF, ISAF, HAF, MAF, FEF, GPF, SRF, FT, MT, and the like. In order to obtain desired durability, the amount of the carbon black is preferably greater than or equal to 30 parts by weight with respect to 100 parts by weight of the rubber component (A) described above. Note that the amount of the carbon black is preferably less than or equal to 150 parts by weight in consideration of the easiness of kneading, forming processability, and the like.

Other additives include a softener, a plasticizer, an antioxidant, a tackifier, a processing aid, and the like. The softeners include: petroleum-based softeners such as process oil, lubricating oil, paraffin, liquid paraffin, and petrolatum; fatty oil-based softeners such as castor oil, linseed oil, canola oil, and palm oil; waxes such as tall oil, a rubber substitute, beeswax, carnauba wax, and lanolin; linoleic acid; pahnitic acid; stearic acid; lauric acid; and the like. The amount of the softener is preferably up to approximately 40 parts by weight with respect to 100 parts by weight of the rubber component (A) described above. The plasticizers include organic acid derivatives such as dioctyl phthalate (DOP) and phosphoric acid derivatives such as tricresyl phosphate. The amount of the plasticizer is preferably approximately 40 parts by weight at most with respect to 100 parts by weight of the rubber component (A) described above, in a similar manner to that of the softener. The antioxidants include phenolic antioxidants, imidazole-based antioxidants, waxes, and the like, and the amount is preferably approximately 0.5 to 10 parts by weight with respect to 100 parts by weight of the rubber component (A) described above.

The rubber composition can be prepared by mixing the contents of (A) to (D) described above and the various additives as necessary. For example, the respective materials other than the crosslinking agent (B), the crosslinking auxiliary agent (C), and the adhesive component (D) are mixed in advance, and then are kneaded for several minutes at 80 to 140° C. After the kneaded product is cooled, the crosslinking agent (B), the crosslinking auxiliary agent (C), and the adhesive component (D) are added, and are kneaded for 5 to 30 minutes at a roll temperature of 40 to 70° C. using a roller such as an open roller, whereby the rubber composition can be prepared. Note that the adhesive component (D) may be added at the time of the preparatory mixture.

REFERENCE SIGNS LIST

1 Fuel cell 10a Air supply hole 10b Air discharge hole
11a Hydrogen supply hole 11b Hydrogen discharge hole 12a Coolant supply hole
12b Coolant discharge hole 13, 14 End plate 2 Cell assembly 3 Electrode member
30 MEA 31 Anode porous layer 32 Cathode porous layer 300 Electrolyte membrane
301 Anode catalyst layer 302 Cathode catalyst layer 310, 320 Gas diffusion layer
311, 321 Gas flow path layer 3A Stepped portion 4 Separator
4A Seal member arrangement portion 4B Electrode member arrangement portion
40 Cathode plate 41 Intermediate plate 42 Anode plate 5 Seal member
50a, 50b, 51a, 51b, 52a, 52b Through hole 53 Convex portion 60 Outer divided body
61 Outer temporary assembly 62 Inner divided body 63 Inner temporary assembly
64 Cell assembly temporary assembly 65 Cell assembly stack 66 Plug
67 die-symmetric stepped portion 68 Seal member preform
69 Seal member temporary assembly 640 Penetration hole 7 Forming die
70 First forming die 71 Second forming die 8 Module

What is claimed is:

1. A manufacturing method of a fuel cell module in which a plurality of cell assemblies are stacked, each cell assembly including:
   an electrode member having a membrane electrode assembly formed from an electrolyte membrane and a pair of electrode catalyst layers disposed on both sides of the electrolyte membrane in a thickness direction, and a pair of porous layers disposed on both sides of the membrane electrode assembly in the thickness direction;
   a separator having an electrode member arrangement portion arranged to be stacked with the electrode member and with which one side of the electrode member in the thickness direction is in contact, and a seal member arrangement portion having a frame shape and disposed on an outer side of the electrode member arrangement portion in a planar direction; and
   a seal member formed from a crosslinked item of solid rubber and disposed in the seal member arrangement portion to seal a peripheral edge portion of the electrode member along a shape of the peripheral edge portion and integrate the electrode member and the separator with each other,
   the method comprising the steps of:
   forming an outer divided body having a frame shape and formed from an uncrosslinked item of solid rubber having adhesiveness in the seal member arrangement portion of the separator to produce an outer temporary assembly, and forming an inner divided body having a frame shape and formed from an uncrosslinked item of solid rubber in the peripheral edge portion of the electrode member to produce an inner temporary assembly, as a preliminary production step;
   fitting the inner temporary assembly into a frame of the outer temporary assembly to produce a cell assembly temporary assembly, as an incorporation step;
   arranging a cell assembly stack, in which a plurality of the cell assembly temporary assemblies are stacked, in a forming die, as a member arrangement step; and
   pressurizing and heating the forming die to crosslink the uncrosslinked item, thereby forming the seal member by integrating the outer divided body and the inner divided body with each other, the seal member sealing the peripheral edge portion of the electrode member and integrating the electrode member and the separator with each other to produce the cell assembly from the cell assembly temporary assemblies, and the seal member also integrating the cell assembly temporary assemblies which are adjacent in the stacking direction with each other to produce the fuel cell module from the cell assembly stack, as an integration step.

2. The manufacturing method of a fuel cell module according to claim 1, wherein
   the cell assembly temporary assemblies have a penetration hole which penetrates in the thickness direction of the electrode member and through which one of oxidizing gas, fuel gas, and coolant flows,
   a plug is disposed in the penetration hole in the member arrangement step such that the uncrosslinked item does not flow into the penetration hole in the integration step, and
   the plug is removed after the fuel cell module is produced in the integration step.

3. The manufacturing method of a fuel cell module according to claim 1, wherein
   among the pair of porous layers disposed on both sides of the membrane electrode assembly in the thickness direction,
   the porous layer disposed on one side of the membrane electrode assembly in the thickness direction has at least one of a gas diffusion layer and a gas flow path layer whose porosity or average pore diameter is larger than that of the gas diffusion layer, and
   the porous layer disposed on the other side of the membrane electrode assembly in the thickness direction has at least one of a gas diffusion layer and a gas flow path layer whose porosity or average pore diameter is larger than that of the gas diffusion layer.

4. The manufacturing method of a fuel cell module according to claim 1, wherein
   the pair of porous layers disposed on both sides of the membrane electrode assembly in the thickness direction have the gas diffusion layer respectively, and an area of the membrane electrode assembly is larger than an area of at least one gas diffusion layer.

5. The manufacturing method of a fuel cell module according to claim 1, wherein
the solid rubber includes one or more rubber components selected from a group consisting of ethylene-propylene rubber, ethylene-propylene-diene rubber, acrylonitrile-butadiene rubber, hydrogenated acrylonitrile-butadiene rubber, styrene-butadiene rubber, and butadiene rubber.

6. The manufacturing method of a fuel cell module according to claim 1, wherein
the uncrosslinked item of solid rubber includes the following contents of (A) to (D);
(A) at least one rubber component selected from a group consisting of ethylene-propylene rubber, ethylene-propylene-diene rubber, acrylonitrile-butadiene rubber, and hydrogenated acrylonitrile-butadiene rubber;
(B) a crosslinking agent selected from organic peroxides of which a 1-hour half-life period temperature is lower than or equal to 130° C.;
(C) a crosslinking auxiliary agent; and
(D) an adhesive component formed of at least one of a resorcinol compound together with a melamine compound and a silane coupling agent.

7. A manufacturing method of a fuel cell, comprising the step of stacking a plurality of the fuel cell modules produced in accordance with the manufacturing method of a fuel cell module according to claim 1 in the thickness direction of the electrode member to produce a fuel cell.

8. The manufacturing method of a fuel cell module according to claim 1, wherein
the outer temporary assembly produced in the preliminary production step has a recess formed by a surface of the separator and an inner periphery of the outer temporary assembly,
the cell assembly temporary assembly is produced by fitting the inner temporary assembly into the recess of the outer temporary assembly in the incorporation step.

9. The manufacturing method of a fuel cell module according to claim 8, wherein
the cell assembly temporary assembly is produced by fitting an entirety of the inner temporary assembly into the recess of the outer temporary assembly in the incorporation step.

* * * * *